US010234278B2

(12) United States Patent
Heidemann et al.

(10) Patent No.: US 10,234,278 B2
(45) Date of Patent: Mar. 19, 2019

(54) AERIAL DEVICE HAVING A THREE-DIMENSIONAL MEASUREMENT DEVICE

(71) Applicant: FARO Technologies, Inc., Lake Mary, FL (US)

(72) Inventors: Rolf Heidemann, Stuttgart (DE); Denis Wohlfeld, Ludwigsburg (DE); Robert E. Bridges, Kennett Square, PA (US); Helmut Kramer, Mainbernheim (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/991,433

(22) Filed: May 29, 2018

(65) Prior Publication Data

US 2018/0274910 A1 Sep. 27, 2018

Related U.S. Application Data

(63) Continuation of application No. 15/250,324, filed on Aug. 29, 2016, now Pat. No. 9,989,357.
(Continued)

(51) Int. Cl.
*G01B 11/25* (2006.01)
*B64C 39/00* (2006.01)
(Continued)

(52) U.S. Cl.
CPC .......... *G01B 11/2513* (2013.01); *B64C 39/00* (2013.01); *B64C 39/024* (2013.01);
(Continued)

(58) Field of Classification Search
CPC ........ B64C 2201/027; B64C 2201/123; B64C 39/00; B64C 39/024; G01B 11/24;
(Continued)

(56) References Cited

U.S. PATENT DOCUMENTS

2013/0215433 A1 8/2013 Crampton
2014/0046589 A1 2/2014 Metzler et al.
(Continued)

OTHER PUBLICATIONS

International Preliminary Report on Patentability for Application No. PCT/US2016/049372 dated Mar. 22, 2018; (8 pgs).
(Continued)

*Primary Examiner* — Tri T Ton
(74) *Attorney, Agent, or Firm* — Cantor Colburn LLP

(57) ABSTRACT

A three-dimensional (3D) coordinate measuring system is provided. The system includes an aerial measuring device that has an aerial drone and a 3D measurement device. The 3D measurement device being rotatably attached to the aerial drone, the aerial drone is movable from a first position to a stationary second position. The 3D measurement device being configured to optically measure points on the surface of an object. The system further includes one or more processors configured to execute nontransitory computer readable instructions. The computer readable instructions comprise: moving the aerial measuring device from the first position; landing the aerial measuring device at the second position; rotating the 3D measurement device to optically measure a first object point; and determining a first 3D coordinates of the first object point with the 3D measuring device.

15 Claims, 21 Drawing Sheets

Related U.S. Application Data

(60) Provisional application No. 62/215,978, filed on Sep. 9, 2015, provisional application No. 62/216,027, filed on Sep. 9, 2015.

(51) Int. Cl.
*G01C 15/00* (2006.01)
*G01B 11/24* (2006.01)
*B64C 39/02* (2006.01)

(52) U.S. Cl.
CPC ............ *G01B 11/24* (2013.01); *G01B 11/254* (2013.01); *G01B 11/2545* (2013.01); *G01C 15/00* (2013.01); *G01C 15/002* (2013.01); *B64C 2201/027* (2013.01); *B64C 2201/123* (2013.01)

(58) Field of Classification Search
CPC .. G01B 11/2513; G01B 11/254; G01C 15/00; G01C 15/002
USPC .................................. 356/600–640
See application file for complete search history.

(56) References Cited

U.S. PATENT DOCUMENTS

| | | |
|---|---|---|
| 2015/0116693 A1 | 4/2015 | Ohtomo et al. |
| 2015/0220085 A1 | 8/2015 | Ohtomo et al. |
| 2017/0067734 A1 | 3/2017 | Heidemann et al. |

OTHER PUBLICATIONS

International Search Report and Written Opinion for International Application No. PCT/US2016/049372 dated Oct. 25, 2016; (13 pgs).

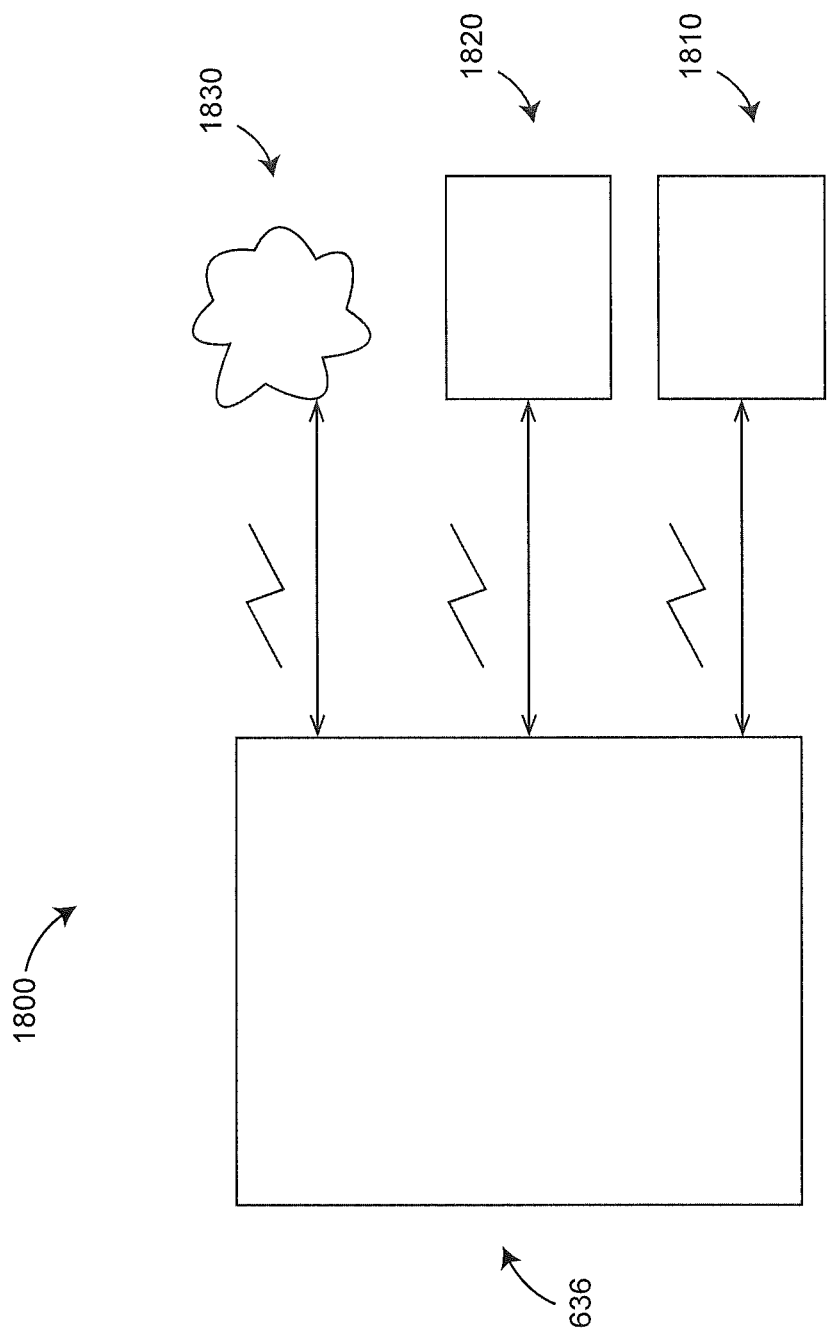

AERIAL DEVICE HAVING A THREE-DIMENSIONAL MEASUREMENT DEVICE

CROSS-REFERENCE TO RELATED APPLICATIONS

The present Application is a continuation application of U.S. application Ser. No. 15/250,324 filed on Aug. 29, 2016, which is a Nonprovisional Application of U.S. Provisional Application Ser. No. 62/215,978 filed on Sep. 9, 2015, and U.S. Provisional Application Ser. No. 62/216,021 filed on Sep. 9, 2015, and also U.S. Provisional Application Ser. No. 62/216,027 filed on Sep. 9, 2015, the contents of all of which are incorporated herein by reference in their entirety.

FIELD OF THE INVENTION

The subject matter disclosed herein relates in general to system for measuring three-dimensional (3D) coordinates using a scanner device operated from a mover apparatus such as a drone.

BACKGROUND

A 3D imager uses a triangulation method to measure the 3D coordinates of points on an object. The 3D imager usually includes a projector that projects onto a surface of the object either a pattern of light in a line or a pattern of light covering an area. A camera is coupled to the projector in a fixed relationship, for example, by attaching a camera and the projector to a common frame. The light emitted from the projector is reflected off of the object surface and detected by the camera. Since the camera and projector are arranged in a fixed relationship, the distance to the object may be determined using trigonometric principles. Compared to coordinate measurement devices that use tactile probes, triangulation systems provide advantages in quickly acquiring coordinate data over a large area. As used herein, the resulting collection of 3D coordinate values or data points of the object being measured by the triangulation system is referred to as point cloud data or simply a point cloud.

A 3D imager may be attached to a variety of mover devices such as robotic devices and aerial drones. A method known as videogrammetry provides a way to register multiple 3D data sets when there is relative motion between the 3D imager and an object being measured. Videogrammetry can further be used to provide data needed to directly determine 3D coordinates when multiple two-dimensional (2D) images with the camera at different positions relative to the object being measured. In this case, videogrammetry is further making use of triangulation principles. Hence the term videogrammetry as used herein is understood to further encompass triangulation.

A particular issue that may be encountered when using triangulation (which may further include videogrammetry) is lack of accuracy and detail when distances from a 3D imager to an object are large or variable. Accordingly, while existing triangulation-based 3D imager devices are suitable for their intended purpose, the need for improvement remains.

BRIEF DESCRIPTION

According to an embodiment of the present invention, a three-dimensional (3D) coordinate measuring system is provided. The system includes an aerial measuring device that has an aerial drone and a 3D measurement device. The 3D measurement device being rotatably attached to the aerial drone, the aerial drone is movable from a first position to a stationary second position. The 3D measurement device being configured to optically measure points on the surface of an object. The system further includes one or more processors configured to execute nontransitory computer readable instructions. The computer readable instructions comprise: moving the aerial measuring device from the first position; landing the aerial measuring device at the second position; rotating the 3D measurement device to optically measure a first object point; and determining a first 3D coordinates of the first object point with the 3D measuring device.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 18 is a schematic representation of a computing system according to an embodiment.

The detailed description explains embodiments of the invention, together with advantages and features, by way of example with reference to the drawings.

DETAILED DESCRIPTION

Embodiments of the present invention provide advantages in measuring large objects with 3D imagers, obtaining relatively high accuracy while providing color (texture) information.

Figure 1A:
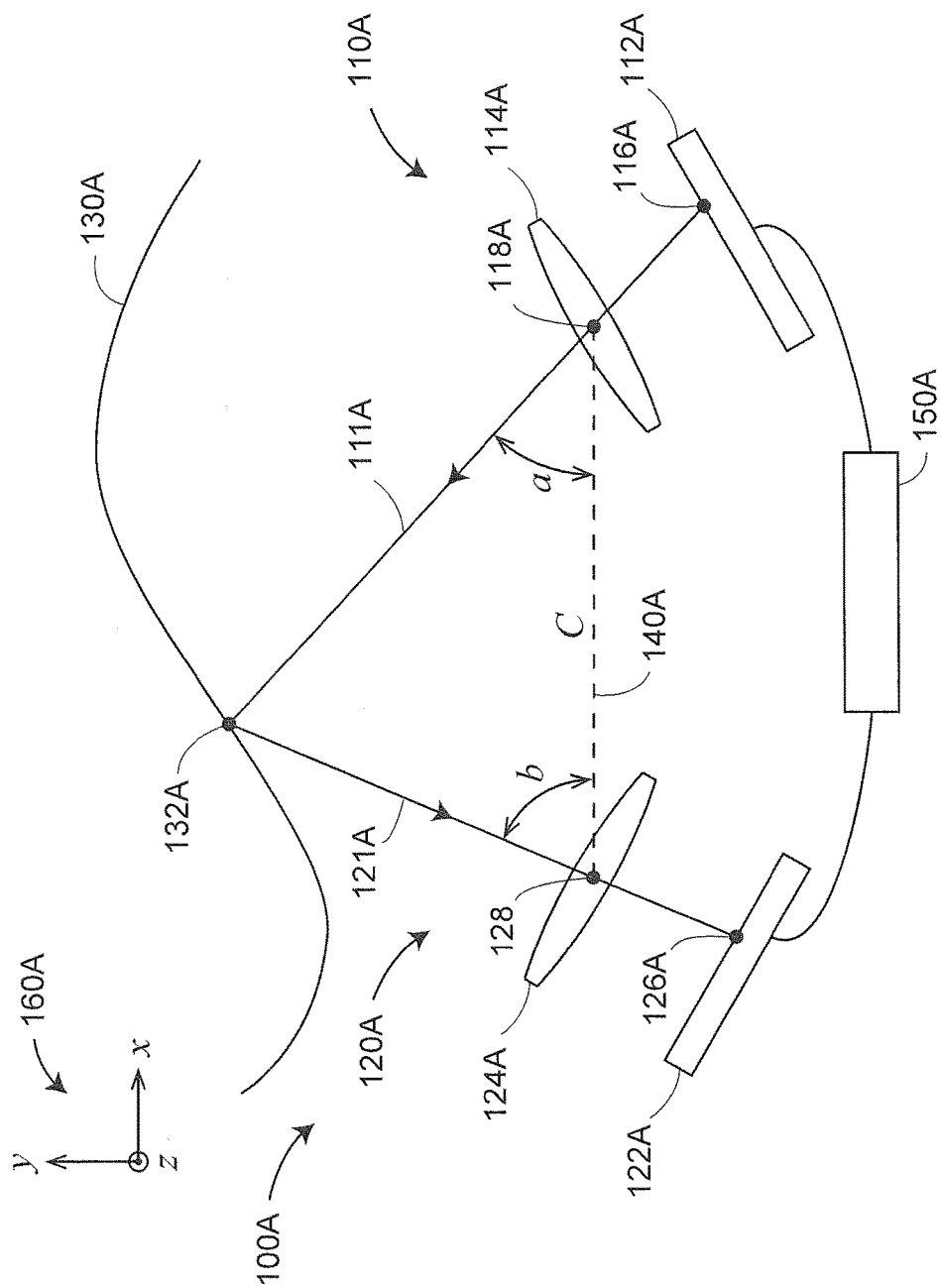
FIGS. 1A and 1B are block diagrams of a 3D imager and a stereo camera pair, respectively, according to an embodiment.

FIG. 1A shows a triangulation scanner (3D imager) 100A that projects a pattern of light over an area on a surface 130A. Another name for a structured light triangulation scanner is a 3D imager. The scanner 100A, which has a frame of reference 160A, includes a projector 110A and a camera 120A. The projector 110A includes an illuminated projector pattern generator 112A, a projector lens 114A, and a perspective center 118A through which a ray of light 111A emerges. The ray of light 111A emerges from a corrected point 116A having a corrected position on the pattern generator 112A. In an embodiment, the point 116A has been corrected to account for aberrations of the projector, including aberrations of the lens 114A, in order to cause the ray to pass through the perspective center 118A, thereby simplifying triangulation calculations.

The ray of light 111A intersects the surface 130A in a point 132A, which is reflected (scattered) off the surface and sent through the camera lens 124A to create a clear image of the pattern on the surface 130A on the surface of a photosensitive array 122A. The light from the point 132A passes in a ray 121A through the camera perspective center 128A to form an image spot at the corrected point 126A. The image spot is corrected in position to correct for aberrations in the camera lens. A correspondence is obtained between the point 126A on the photosensitive array 122A and the point 116A on the illuminated projector pattern generator 112A. As explained herein below, the correspondence may be obtained by using a coded or an uncoded pattern, which may in some cases be projected sequentially. Once the correspondence is known, the angles a and b in FIG. 1A may be determined. The baseline 140A, which is a line segment drawn between the perspective centers 118A and 128A, has a length C. Knowing the angles a, b and the length C, all the angles and side lengths of the triangle 128A-132A-118A may be determined. Digital image information is transmitted to a processor 150A, which determines 3D coordinates of the surface 130A. The processor 150A may also instruct the illuminated pattern generator 112A to generate an appropriate pattern. The processor 150A may be located within the scanner assembly, or it may be in an external computer, or a remote server, as discussed further herein below in reference to FIG. 33.

Figure 1B:
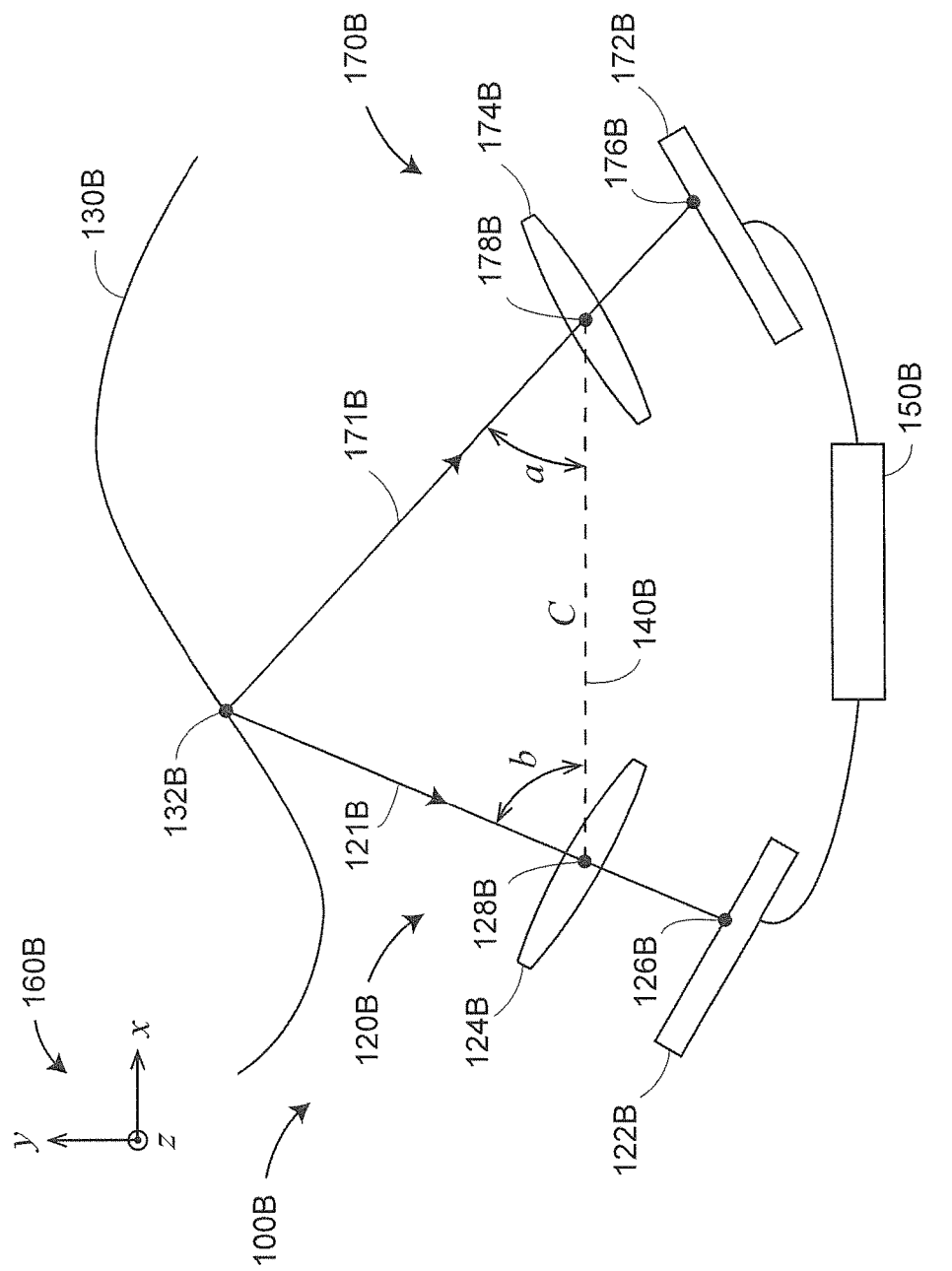

FIG. 1B shows a stereo camera 100B that receives a pattern of light from an area on a surface 130B. The stereo camera 100B, which has a frame of reference 160B, includes a first camera 120B and a second camera 170B. The first camera 120B includes a first camera lens 124B and a first photosensitive array 122B. The first camera 120B has a first camera perspective center 128B through which a ray of light 121B passes from a point 132B on the surface 130B onto the first photosensitive array 122B as a corrected image spot 126B. The image spot is corrected in position to correct for aberrations in the camera lens.

The second camera 170B includes a second camera lens 174B and a second photosensitive array 172B. The second camera 170B has a second camera perspective center 178B through which a ray of light 171B passes from the point 132B onto the second photosensitive array 172B as a corrected image spot 176B. The image spot is corrected in position to correct for aberrations in the camera lens.

A correspondence is obtained between the point 126B on the first photosensitive array 122B and the point 176B on the second photosensitive array 172B. As explained herein below, the correspondence may be obtained using videogrammetry or other methods. Once the correspondence is known, the angles a and b in FIG. 1B may be determined. The baseline 140B, which is a line segment drawn between the perspective centers 128B and 178B, has a length C. Knowing the angles a, b and the length C, all the angles and side lengths of the triangle 128B-132B-178B may be determined. Digital image information is transmitted to a processor 150B, which determines 3D coordinates of the surface 130B. The processor 150B may be located within the stereo camera assembly, or it may be in an external computer, or a remote server, as discussed further herein below in reference to FIG. 33.

Figure 2:
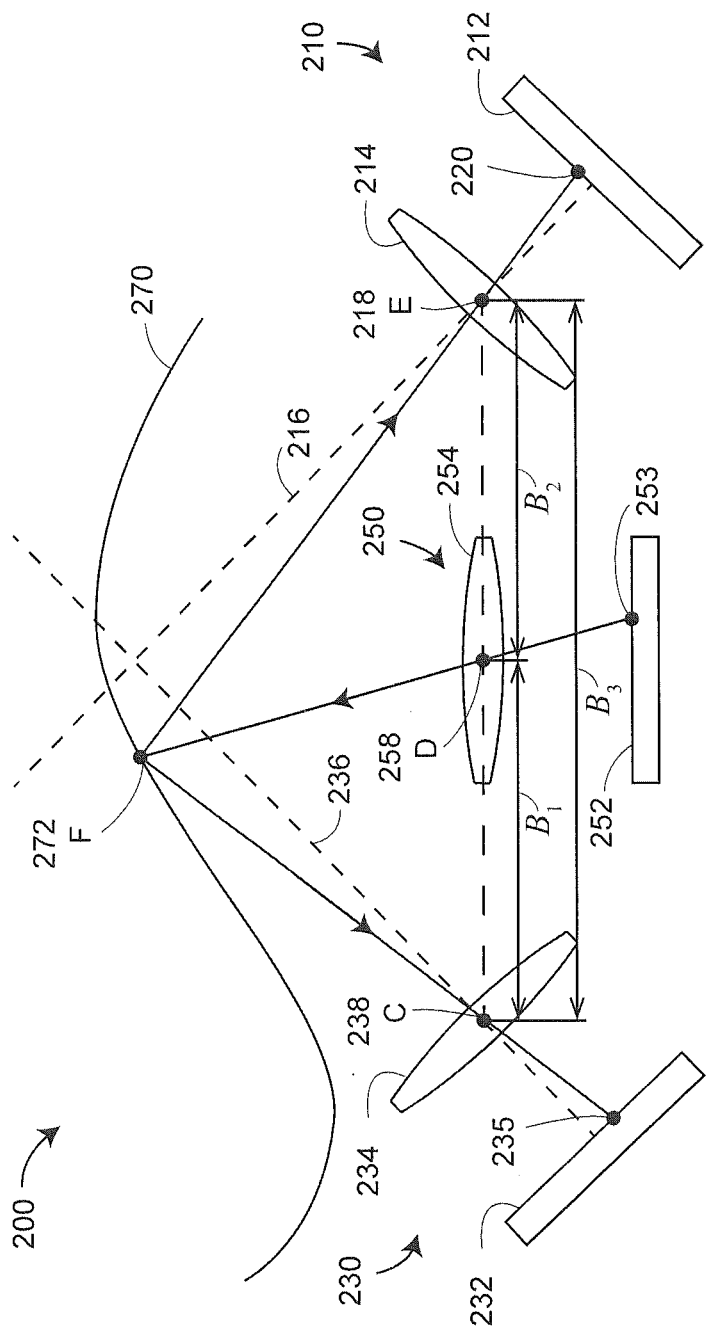
FIG. 2 is a perspective view of a 3D imager having two cameras and a projector according to an embodiment.

FIG. 2 shows a structured light triangulation scanner 200 having a projector 250, a first camera 210, and a second camera 230. The projector 250 creates a pattern of light on a pattern generator plane 252, which it projects from a corrected point 253 on the pattern through a perspective center 258 (point D) of the lens 254 onto an object surface 270 at a point 272 (point F). The point 272 is imaged by the first camera 210 by receiving a ray of light from the point 272 through a perspective center 218 (point E) of a lens 214 onto the surface of a photosensitive array 212 of the camera as a corrected point 220. The point 220 is corrected in the read-out data by applying a correction factor to remove the effects of lens aberrations. The point 272 is likewise imaged by the second camera 230 by receiving a ray of light from the point 272 through a perspective center 238 (point C) of the lens 234 onto the surface of a photosensitive array 232 of the second camera as a corrected point 235. It should be understood that any reference to a lens in this document refers not only to an individual lens but to a lens system, including an aperture within the lens system.

The inclusion of two cameras 210 and 230 in the system 200 provides advantages over the device of FIG. 1A that includes a single camera. One advantage is that each of the two cameras has a different view of the point 272 (point F). Because of this difference in viewpoints, it is possible in some cases to see features that would otherwise be obscured—for example, seeing into a hole or behind a blockage. In addition, it is possible in the system 200 of FIG. 2 to perform three triangulation calculations rather than a single triangulation calculation, thereby improving measurement accuracy. A first triangulation calculation can be made between corresponding points in the two cameras using the triangle CEF with the baseline $B_3$. A second triangulation calculation can be made based on corresponding points of the first camera and the projector using the triangle DEF with the baseline $B_2$. A third triangulation calculation can be made based on corresponding points of the second camera and the projector using the triangle CDF with the baseline $B_1$. The optical axis of the first camera 220 is 216, and the optical axis of the second camera 230 is 236.

Figure 3:
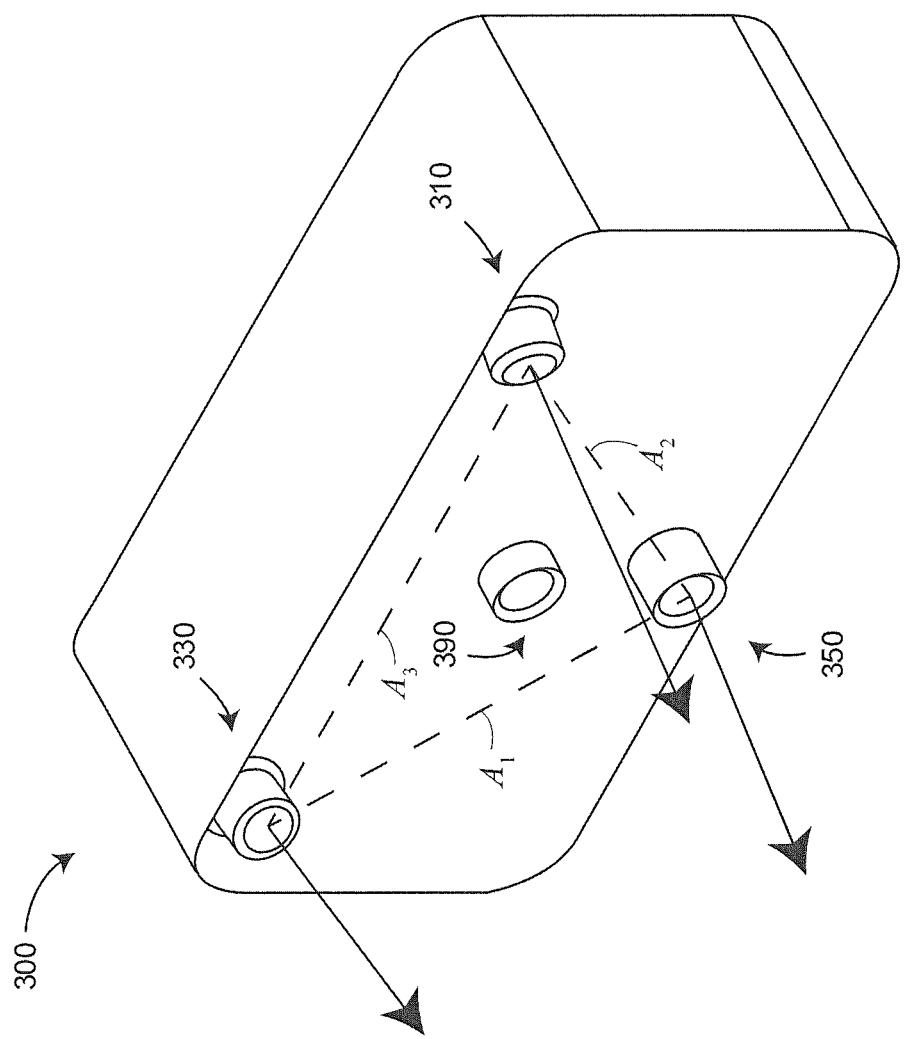
FIG. 3 is a perspective view of a 3D imager having two cameras and a projector according to an embodiment.

FIG. 3 shows 3D imager 300 having two cameras 310, 330 and a projector 350 arranged in a triangle $A_1$-$A_2$-$A_3$. In an embodiment, the 3D imager 300 of FIG. 3 further includes a camera 390 that may be used to provide color (texture) information for incorporation into the 3D image. In addition, the camera 390 may be used to register multiple 3D images through the use of videogrammetry.

Figure 4A:
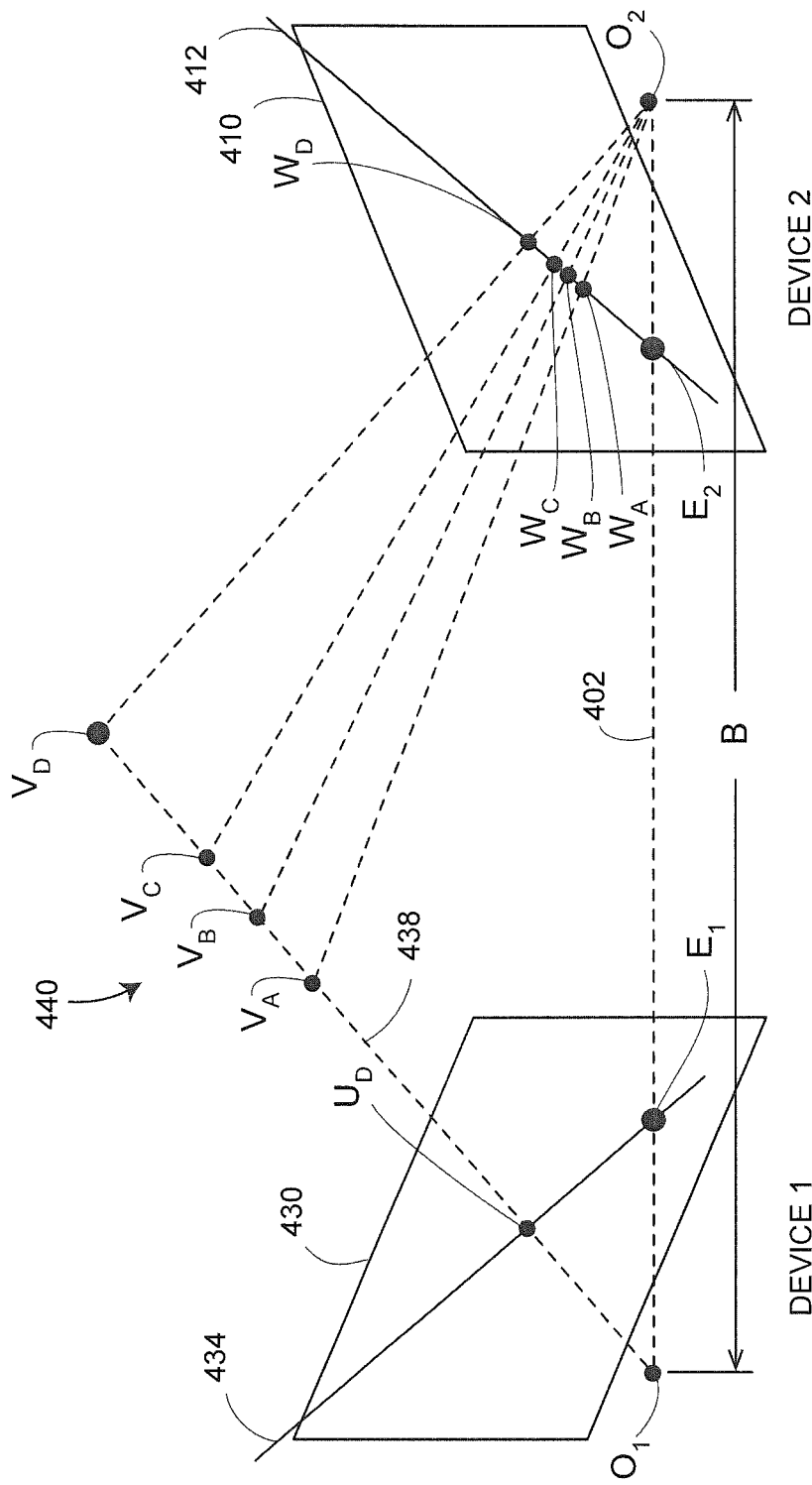
FIGS. 4A and 4B show epipolar geometry for two reference planes and three reference planes, respectively, according to an embodiment.

This triangular arrangement provides additional information beyond that available for two cameras and a projector arranged in a straight line as illustrated in FIG. 2. The additional information may be understood in reference to FIG. 4A, which explain the concept of epipolar constraints, and FIG. 4B, which explains how epipolar constraints are advantageously applied to the triangular arrangement of the 3D imager 300. In FIG. 4A, a 3D triangulation instrument 440 includes a device 1 and a device 2 on the left and right sides, respectively, of FIG. 4A. Device 1 and device 2 may be two cameras or device 1 and device 2 may be one camera and one projector. Each of the two devices, whether a camera or a projector, has a perspective center, $O_1$ and $O_2$, and a reference plane, 430 or 410. The perspective centers are separated by a baseline distance B, which is the length of the line 402 between $O_1$ and $O_2$. The concept of perspective center is discussed in more detail in reference to FIGS. 13C, 13D, and 13E. The perspective centers $O_1$, $O_2$ are points through which rays of light may be considered to travel, either to or from a point on an object. These rays of light either emerge from an illuminated projector pattern, such as the pattern on illuminated projector pattern generator 112A of FIG. 1A, or impinge on a photosensitive array, such as the photosensitive array 122A of FIG. 1A. As can be seen in FIG. 1A, the lens 114A lies between the illuminated object point 932 and plane of the illuminated object projector pattern generator 112A. Likewise, the lens 924A lies between the illuminated object point 132A and the plane of the photosensitive array 122A, respectively. However, the pattern of the front surface planes of devices 112A and 122A would be the same if they were moved to appropriate positions opposite the lenses 114A and 124A, respectively. This placement of the reference planes 430, 410 is applied in FIG. 4A, which shows the reference planes 430, 410 between the object point and the perspective centers $O_1$, $O_2$.

In FIG. 4A, for the reference plane 430 angled toward the perspective center $O_2$ and the reference plane 410 angled toward the perspective center $O_1$, a line 402 drawn between the perspective centers $O_1$ and $O_2$ crosses the planes 430 and 410 at the epipole points $E_1$, $E_2$, respectively. Consider a point $U_D$ on the plane 430. If device 1 is a camera, it is known that an object point that produces the point $U_D$ on the image must lie on the line 438. The object point might be, for example, one of the points $V_A$, $V_B$, $V_C$, or $V_D$. These four object points correspond to the points $W_A$, $W_B$, $W_C$, $W_D$, respectively, on the reference plane 410 of device 2. This is true whether device 2 is a camera or a projector. It is also true that the four points lie on a straight line 412 in the plane 410. This line, which is the line of intersection of the reference plane 410 with the plane of $O_1$-$O_2$-$U_D$, is referred to as the epipolar line 412. It follows that any epipolar line on the reference plane 410 passes through the epipole $E_2$. Just as there is an epipolar line on the reference plane of device 2 for any point on the reference plane of device 1, there is also an epipolar line 434 on the reference plane of device 1 for any point on the reference plane of device 2.

Figure 4B:
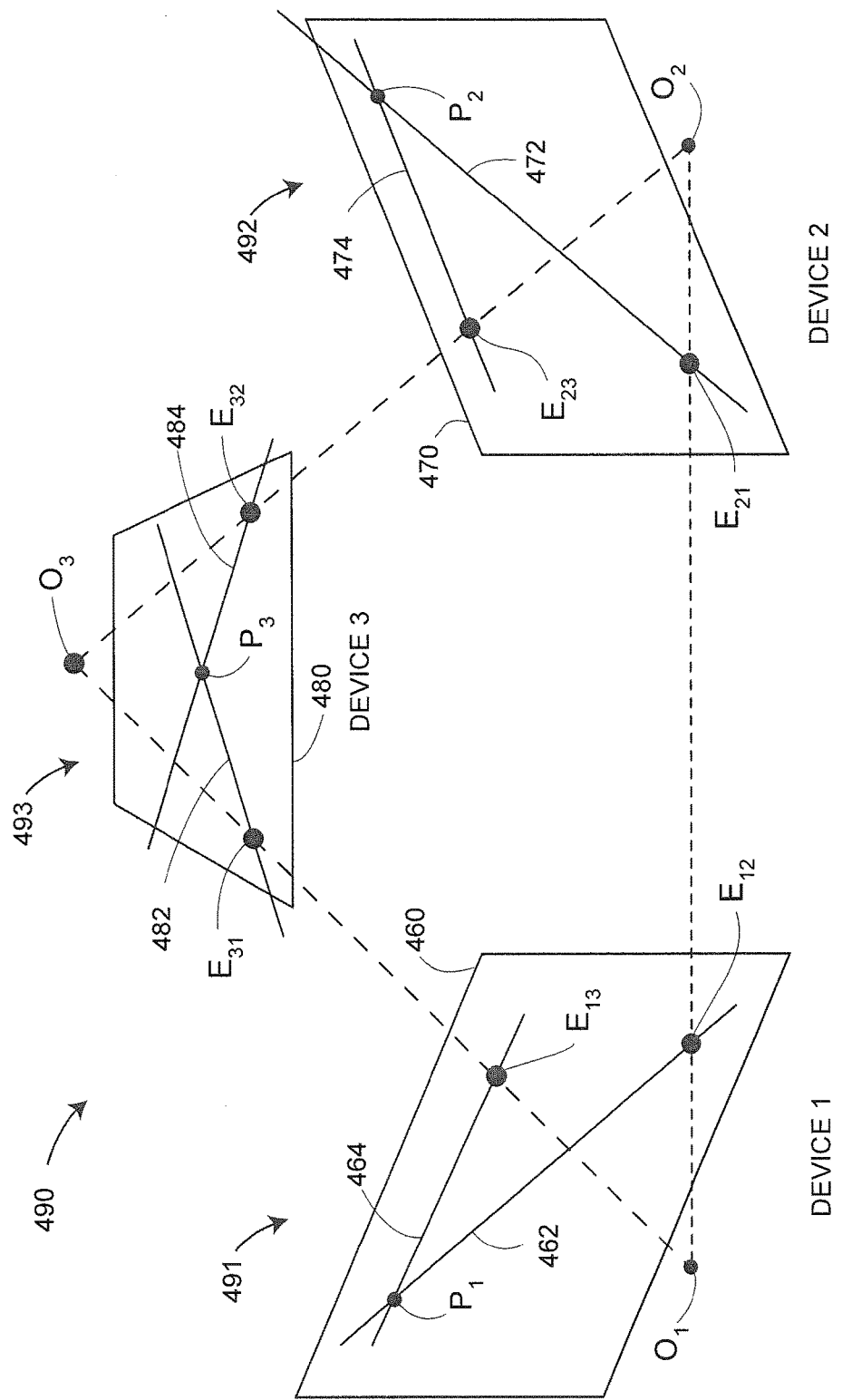

FIG. 4B illustrates the epipolar relationships for a 3D imager 490 corresponding to 3D imager 300 of FIG. 3 in which two cameras and one projector are arranged in a triangular pattern. In general, the device 1, device 2, and device 3 may be any combination of cameras and projectors as long as at least one of the devices is a camera. Each of the three devices 491, 492, 493 has a perspective center $O_1$, $O_2$, $O_3$, respectively, and a reference plane 460, 470, and 480, respectively. Each pair of devices has a pair of epipoles. Device 1 and device 2 have epipoles $E_{12}$, $E_{21}$ on the planes 460, 470, respectively. Device 1 and device 3 have epipoles $E_{13}$, $E_{31}$, respectively on the planes 460, 480, respectively. Device 2 and device 3 have epipoles $E_{23}$, $E_{32}$ on the planes 470, 480, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the situation of FIG. 4B in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 460 to obtain the epipolar line 464. Intersect the plane $P_2$-$E_{21}$-$E_{12}$ to obtain the epipolar line 462. If the image point $P_1$ has been determined consistently, the observed image point $P_1$ will lie on the intersection of the calculated epipolar lines 1262 and 1264.

To check the consistency of the image point $P_2$, intersect the plane $P_3$-$E_{32}$-$E_{23}$ with the reference plane 470 to obtain the epipolar line 474. Intersect the plane $P_1$-$E_{12}$-$E_{21}$ to obtain the epipolar line 472. If the image point $P_2$ has been determined consistently, the observed image point $P_2$ will lie on the intersection of the calculated epipolar lines 472 and 474.

To check the consistency of the projection point $P_3$, intersect the plane $P_2$-$E_{23}$-$E_{32}$ with the reference plane 480 to obtain the epipolar line 484. Intersect the plane $P_1$-$E_{13}$-$E_{31}$ to obtain the epipolar line 482. If the projection point $P_3$ has been determined consistently, the projection point $P_3$ will lie on the intersection of the calculated epipolar lines 482 and 484.

The redundancy of information provided by using a 3D imager 300 having a triangular arrangement of projector and cameras may be used to reduce measurement time, to identify errors, and to automatically update compensation/calibration parameters.

The triangular arrangement of the 3D imager 300 may also be used to automatically update compensation/calibration parameters. Compensation parameters are numerical values stored in memory, for example, in an internal electrical system of an 3D measurement device or in another external computing unit. Such parameters may include the relative positions and orientations of the cameras and projector in the 3D imager. The compensation parameters may relate to lens characteristics such as lens focal length and lens aberrations. They may also relate to changes in environmental conditions such as temperature. Sometimes the term calibration is used in place of the term compensation. Often compensation procedures are performed by the manufacturer to obtain compensation parameters for a 3D imager. In addition, compensation procedures are often performed by a user. User compensation procedures may be performed when there are changes in environmental conditions such as temperature. User compensation procedures may also be performed when projector or camera lenses are changed or after then instrument is subjected to a mechanical shock.

Inconsistencies in results based on epipolar calculations for a 3D imager 1290 may indicate a problem in compensation parameters, which are numerical values stored in memory. Compensation parameters are used to correct imperfections or nonlinearities in the mechanical, optical, or electrical system to improve measurement accuracy. In some cases, a pattern of inconsistencies may suggest an automatic correction that can be applied to the compensation parameters. In other cases, the inconsistencies may indicate a need to perform user compensation procedures.

It is often desirable to integrate color information into 3D coordinates obtained from a triangulations scanner (3D imager). Such color information is sometimes referred to as "texture" information since it may suggest the materials being imaged or reveal additional aspects of the scene such as shadows. Usually such color (texture) information is provided by a color camera separated from the camera in the triangulation scanner (i.e., the triangulation camera). An example of a separate color camera is the camera 390 in the 3D imager 300 of FIG. 3.

In some cases, it is desirable to supplement 3D coordinates obtained from a triangulation scanner with information from a two-dimensional (2D) camera covering a wider field-of-view (FOV) than the 3D imager. Such wide-FOV information may be used for example to assist in registration. For example, the wide-FOV camera may assist in registering together multiple images obtained with the triangulation camera by identifying natural features or artificial targets outside the FOV of the triangulation camera. For example, the camera 390 in the 3D imager 300 may serve as both a wide-FOV camera and a color camera.

If a triangulation camera and a color camera are connected together in a fixed relationship, for example, by being mounted onto a common base, then the position and orientation of the two cameras may be found in a common frame of reference. Position of each of the cameras may be characterized by three translational degrees-of-freedom (DOF), which might be for example x-y-z coordinates of the camera perspective center. Orientation of each of the cameras may be characterized by three orientational DOF, which might be for example roll-pitch-yaw angles. Position and orientation together yield the pose of an object. In this case, the three translational DOF and the three orientational DOF together yield the six DOF of the pose for each camera. A compensation procedure may be carried out by a manufacturer or by a user to determine the pose of a triangulation scanner and a color camera mounted on a common base, the pose of each referenced to a common frame of reference.

In an embodiment, 3D coordinates are determined based at least in part on triangulation. A triangulation calculation requires knowledge of the relative position and orientation of at least one projector such as 1310A and one camera such as 1320A.

In another embodiment, 3D coordinates are obtained by identifying features or targets on an object and noting changes in the features or target as the object 1330 moves. The process of identifying natural features of an object 1330 in a plurality of images is sometimes referred to as videogrammetry. There is a well-developed collection of techniques that may be used to determine points associated with features of objects as seen from multiple perspectives. Such techniques are generally referred to as image processing or feature detection. Such techniques, when applied to determination of 3D coordinates based on relative movement between the measuring device and the measured object, are sometimes referred to as videogrammetry techniques.

The common points identified by the well-developed collection of techniques described above may be referred to as cardinal points. A commonly used but general category for finding the cardinal points is referred to as interest point detection, with the detected points referred to as interest points. According to the usual definition, an interest point has a mathematically well-founded definition, a well-defined position in space, an image structure around the interest point that is rich in local information content, and a variation in illumination level that is relatively stable over time. A particular example of an interest point is a corner point, which might be a point corresponding to an intersection of three planes, for example. Another example of signal processing that may be used is scale invariant feature transform (SIFT), which is a method well known in the art and described in U.S. Pat. No. 6,711,293 to Lowe. Other common feature detection methods for finding cardinal points include edge detection, blob detection, and ridge detection.

Figure 5:
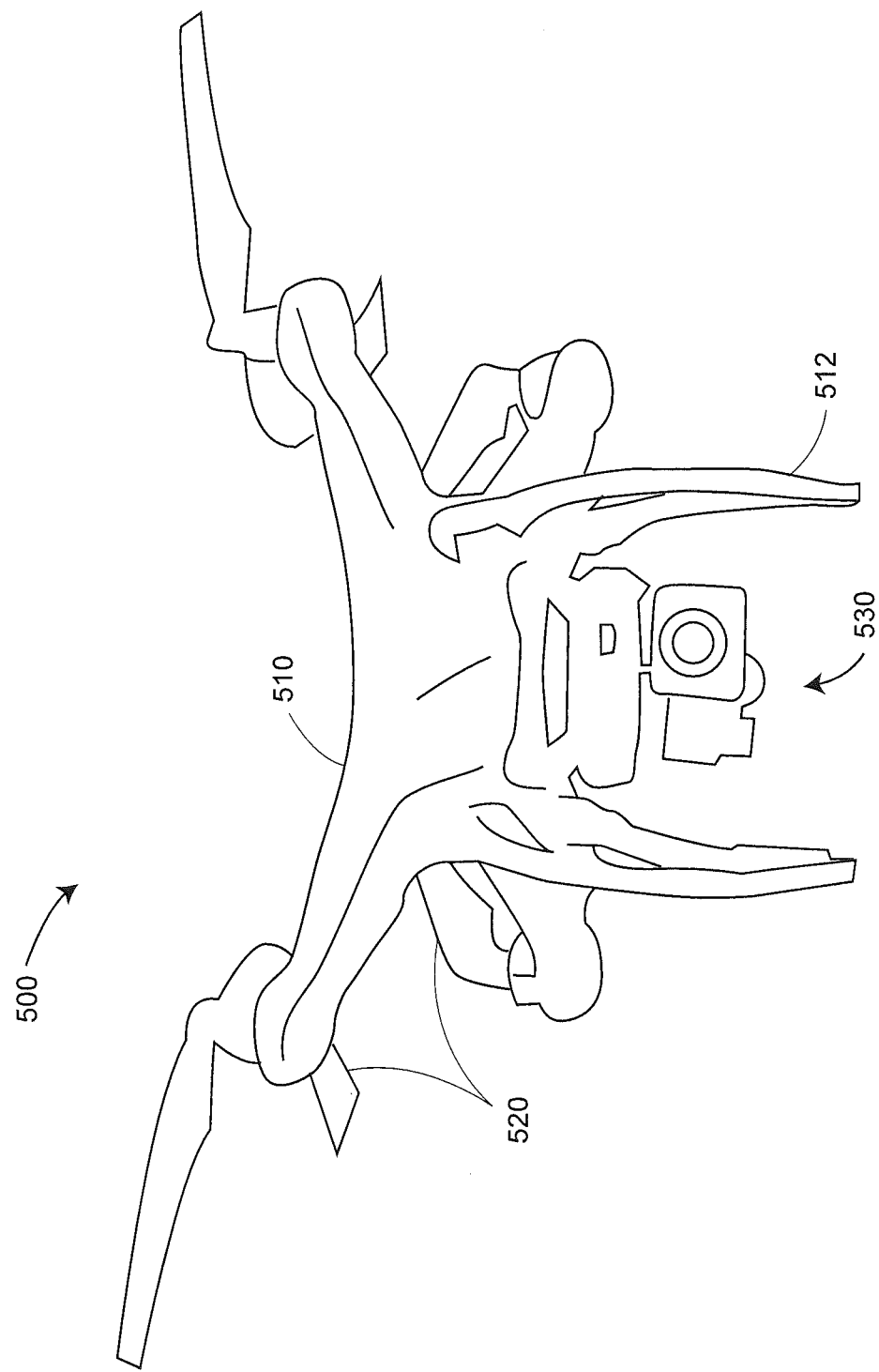
FIG. 5 is a perspective view of an aerial drone carrying a 2D camera.

FIG. 5 is a perspective view of an aerial quadcopter drone 500 having a body 510, four legs, and four rotors 520. The quadcopter drone is capable of flying in any direction or hovering through the use of four rotors 520. A two-dimensional (2D) camera is mounted to the drone. Other drones may use more or fewer rotors. In other embodiments, the camera 530 may be mounted to a different type of aerial drone, for example one having fixed wings that do not provide hovering capability.

Figure 6:
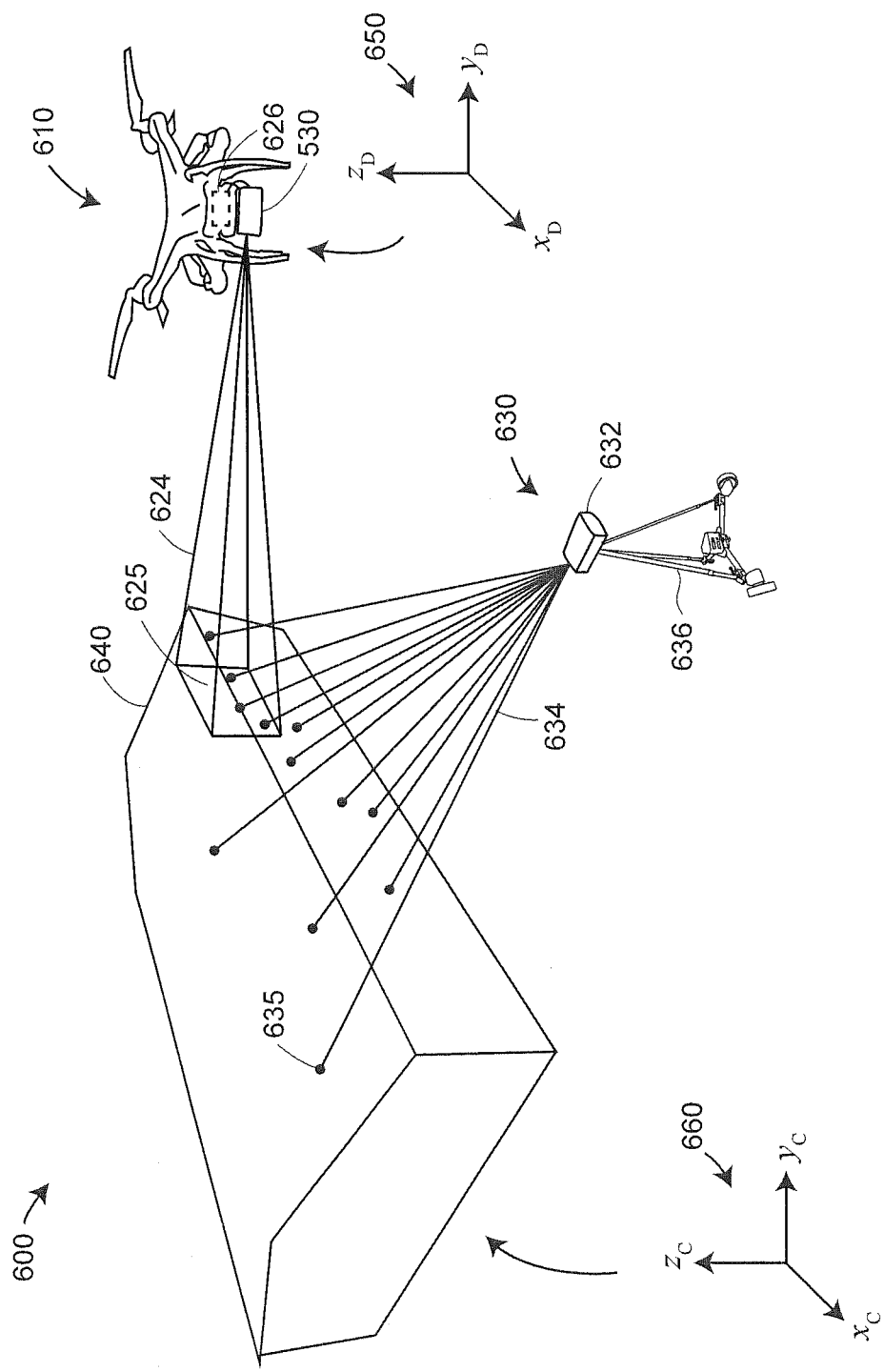
FIGS. 6 and 6B illustrates a measurement scenario in which an aerial drone carrying a 2D camera is used in combination with an external projector to obtain 3D coordinates of an object according to an embodiment.

FIG. 6 is a perspective view of a measurement scenario 600 involving a drone 610 and a projector system. The drone 610 includes a 2D camera 530 and a computing device 626. In an embodiment, the computing device 626 has the capability of a personal computer. In another embodiment, the computing device 626 provides some preprocessing but sends the preprocessed signal to a remote computer or computer network for further processing. The preprocessed signal may be sent to the remote computer wirelessly or through a wire attached to a tether.

Figure 6B:
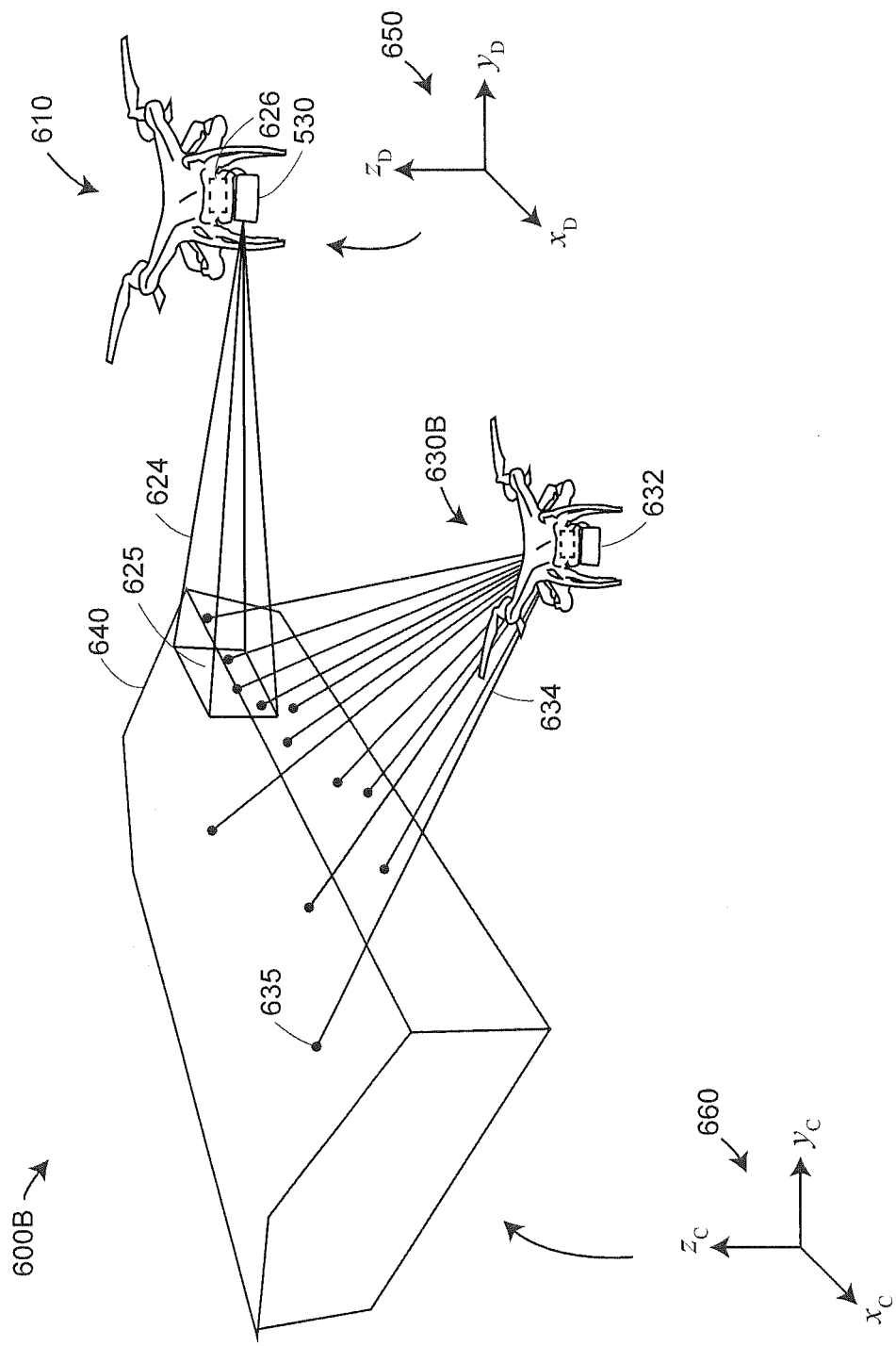

The projector system 630 includes a projector 632 and a stand 636. In an embodiment, the stand 636 includes a tripod and motorized wheels. In an embodiment, the motorized wheels respond to computer control, for example, to wireless signals from a remote computer or network. In an alternative embodiment illustrated in a measurement scenario 600B, the projector system 640 in FIG. 6 is replaced with a projector system 636B in FIG. 6B having a drone 636B in place of the stand 636. In an embodiment, the drone 636B is configured to fly the projector 632 to a desired location before landing and projecting light rays 634. In an embodiment, the projector 632 is configured to project laser light through a diffraction grating to produce rays 634 that end at an object 640 in a collection of spots 635. In an embodiment, the spots are approximately circular and are projected in a rectangular grid pattern. In another embodiment, the diffraction grating is configured to give some of the projected spots more power than the others, thereby enabling some of the spots to be distinguished from the others. In an embodiment, spots 635 on the surface of the object 640 are viewed by the 2D camera 530.

In an embodiment, the camera 530 collects multiple 2D images, the images including some of the projected spots 635. The projected spots provide a way to register multiple 2D data sets. If the camera 530 collects the multiple 2D images from different positions and if a combination of natural features and projected spots provide registration features in each of the 2D data sets, it may be possible to determine 3D coordinates using triangulation based on the multiple 2D camera images.

Each of the images collected by the 2D camera 530 are said to be in a device frame of reference that changes with the position and orientation of the aerial drone. The device frame of reference 650 may be represented by three orthogonal axes $x_D$, $y_D$, and $z_D$, as shown in FIGS. 6, 6B, 8, 9, 11, 12, 15, 16, and 17. The multiple 2D images and obtained in the device frame of reference 650 are moved into a common frame of reference 660 that is fixed (stationary) with respect to the object 640. The common frame of reference 660 may be represented by three orthogonal axes $x_C$, $y_C$, and $z_C$, as shown in FIGS. 6, 6B, 8, 9, 11, 12, 15, 16, and 17.

In a further embodiment, an aerial quadcopter drone 700 includes a body 510, four legs, and four rotors 520. A 3D imager 300, discussed herein above in reference to FIG. 3, is attached to the drone 700. In an embodiment, the 3D imager 300 includes two cameras 310, 330 and a projector 350 arranged in a triangle. The projector projects a pattern of light onto a region 725 of the object 640, and the two cameras 310, 330 receive reflected light from the region 725. The drone 700 also includes a camera 390 that may be used to provide color (texture) information for incorporation into the 3D image and to assist in registration. The 3D imager enables measurement of 3D coordinates through the combined use of triangulation and videogrammetry. A personal computer or similar computing device 626 cooperates with the 3D imager 300 to process collected data to obtain 3D coordinates. Spots of light 635 are projected onto the object 640 to provide registration markers for the 3D imager 300. In an embodiment, the spots 634 are at a different wavelength than the pattern of light projected by the projector 350. For example, in an embodiment, the spots of light form the projector 350 are in the infrared range, while the spots of light from the projector 634 are in the visible range, which appear in images of the camera 390. In another embodiment, the projected spots of light 350 and 634 are at the same wavelength.

The determination of 3D coordinates of points on the object surface are greatly assisted in the geometry of the 3D imager 300 that includes the two cameras 310, 330, and the projector 350 arranged in a triangle. The multiple epipolar relationships provided by the triangular relationship of the devices 310, 330, and 350 was described herein above in reference to FIG. 4B. When solving for 3D coordinates on the object surface based on the projected pattern of light from the internal projector 350 and the images obtained by the first camera and the second camera, the epipolar constraints imposed by the geometry of FIG. 4B are used. The term "epipolar constraints" as used herein means all of the geometrical constraints of the cameras 310, 330 and the projector 350. These geometrical constraints include the six degree-of-freedom pose of each of the three devices 310, 330, and 350 relative to the other devices. As such, the epipolar constraints provide the baseline distances between each of the devices 310, 330, and 350. Epipolar constraints also provide constraints on the position of the reference plane of each of the devices relative to the perspective center of each of the devices. Implicitly included in such constraints are the focal length of each of the lens systems, the positions of the projection plane of the projector 350 and the image planes of the cameras 310, 330, and the size and number of pixels in each of the devices 310, 330 and 350.

Each of the images collected by the cameras 310, 330, and 390 are said to be in a device frame of reference that changes with the position and orientation of the aerial drone. The device frame of reference 650 may be represented by three orthogonal axes $x_D$, $y_D$, and $z_D$, as shown in FIGS. 6, 6B, 8, 9, 11, 12, 15, 16, and 17. The multiple 2D images resulting 3D coordinates obtained in the device frame of reference 650 are moved into a common frame of reference 660 that is fixed (stationary) with respect to the object 640. The common frame of reference 660 may be represented by three orthogonal axes $x_C$, $y_C$, and $z_C$, as shown in FIGS. 6, 6B, 8, 9, 11, 12, 15, 16, and 17.

In an embodiment, the stand 636 includes motorized wheels that cause it to move near to or farther from the object 640 according to the needs of the measurement. Usually the projector system 630 will be moved closer to the object 640 when the drone 700 moves closer to the object 640. The objective is to maintain as a relatively large number of projected spots in the region 725. As the drone 700 moves closer to the object 640, the area 725 decreases. It is desirable that the number of projected spots 635 decrease correspondingly.

In an embodiment, the drone 700 is configured to adjust it position from far to near according to measurement needs. The drone may first measure the object 640 over a relatively large FOV and then move closer to the object 640 to measure features of interest on the object 640 in greater detail and with higher accuracy. The projector system 630 may likewise move closer to the object in response. In an embodiment, the stand 636 is replaced by the drone 636B, which can move the 3D imager 300 to any needed location.

Figure 7:
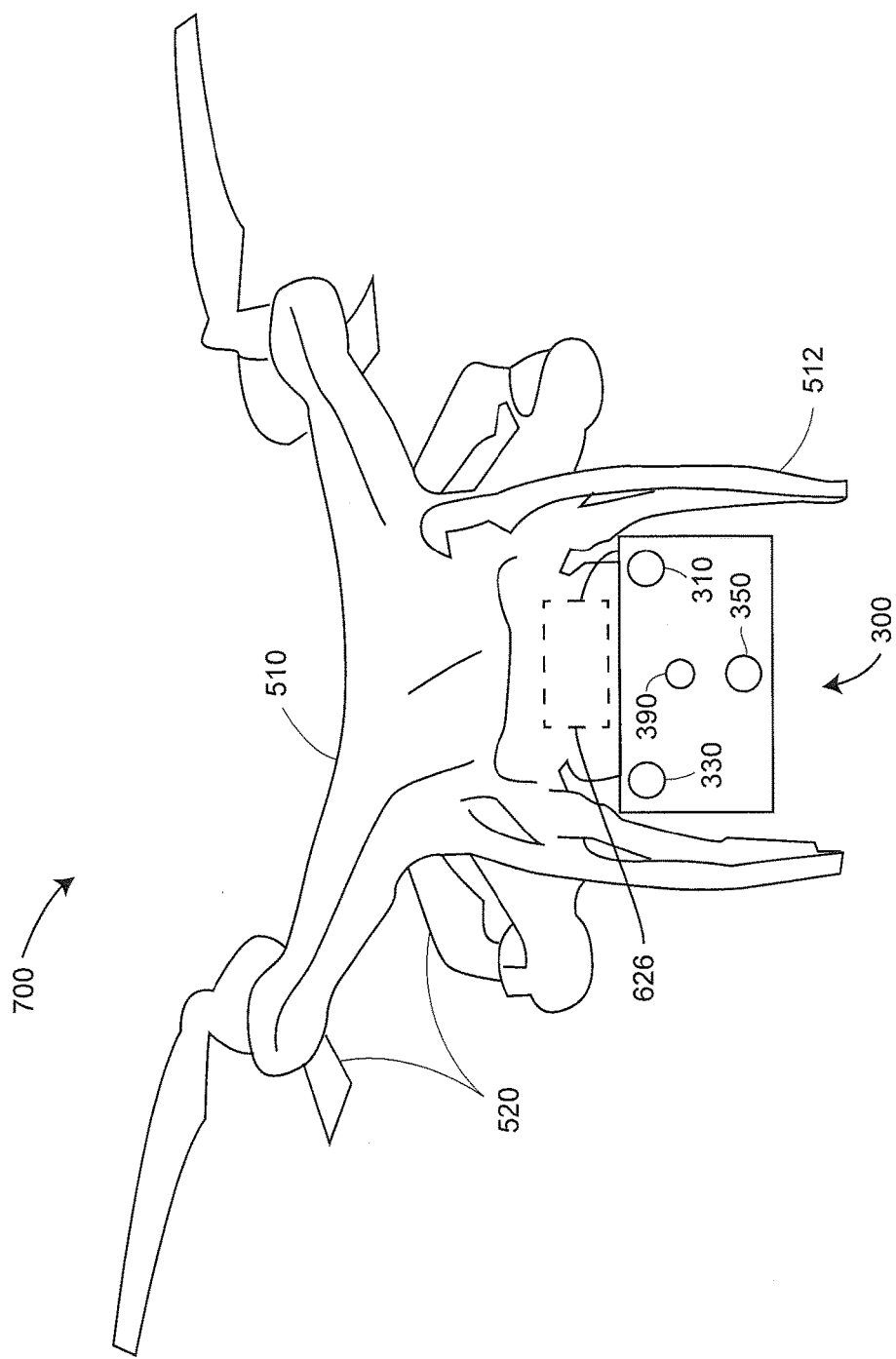
FIG. 7 is a perspective view of an aerial drone that includes a 3D imager and a registration camera according to an embodiment.
Figure 8:
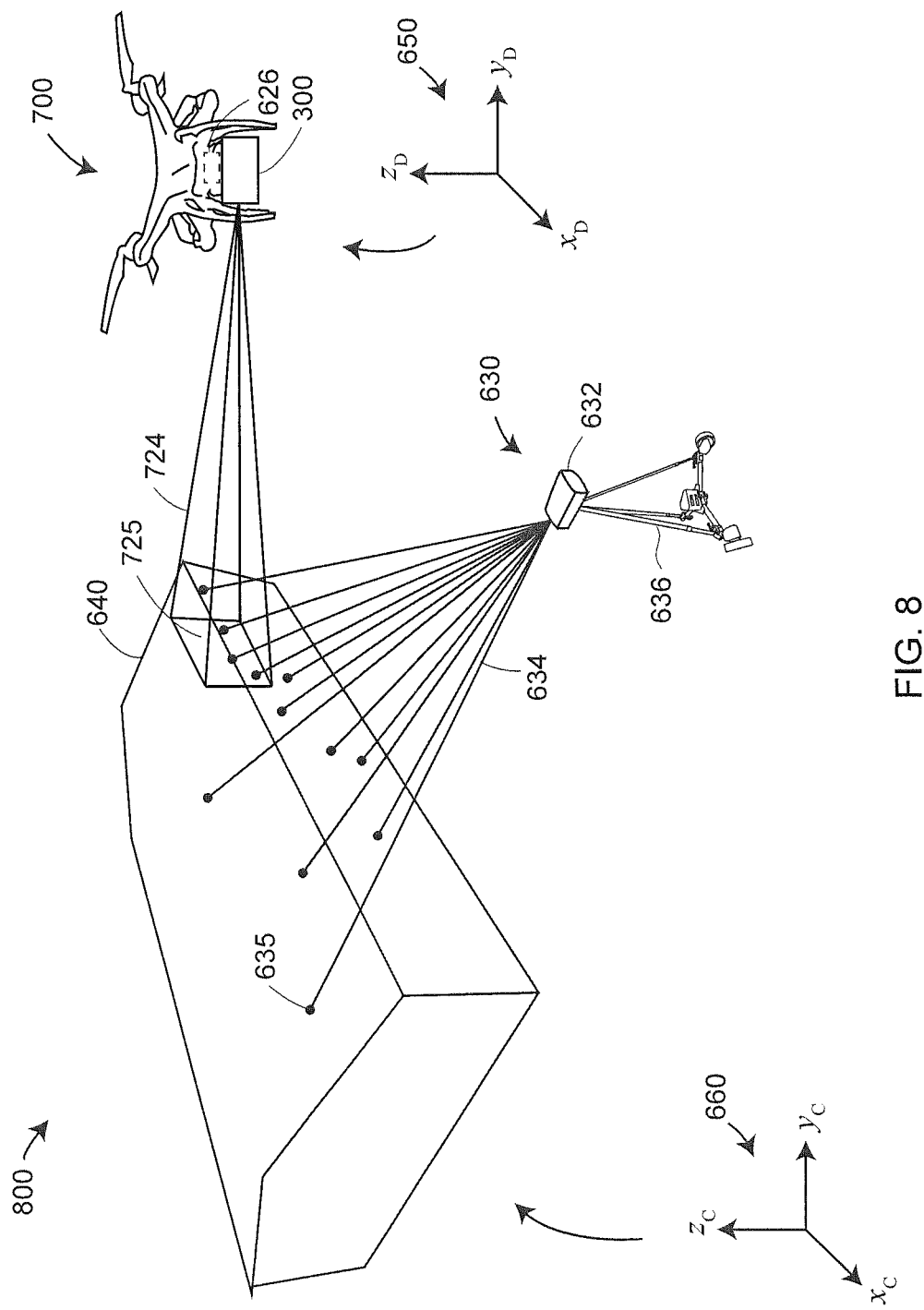
FIGS. 8 and 9 illustrate measurement scenarios in which an aerial drone having a 3D imager and a registration camera are used with an external projector moved to two different positions to determine 3D coordinates of an object according to an embodiment.
Figure 9:
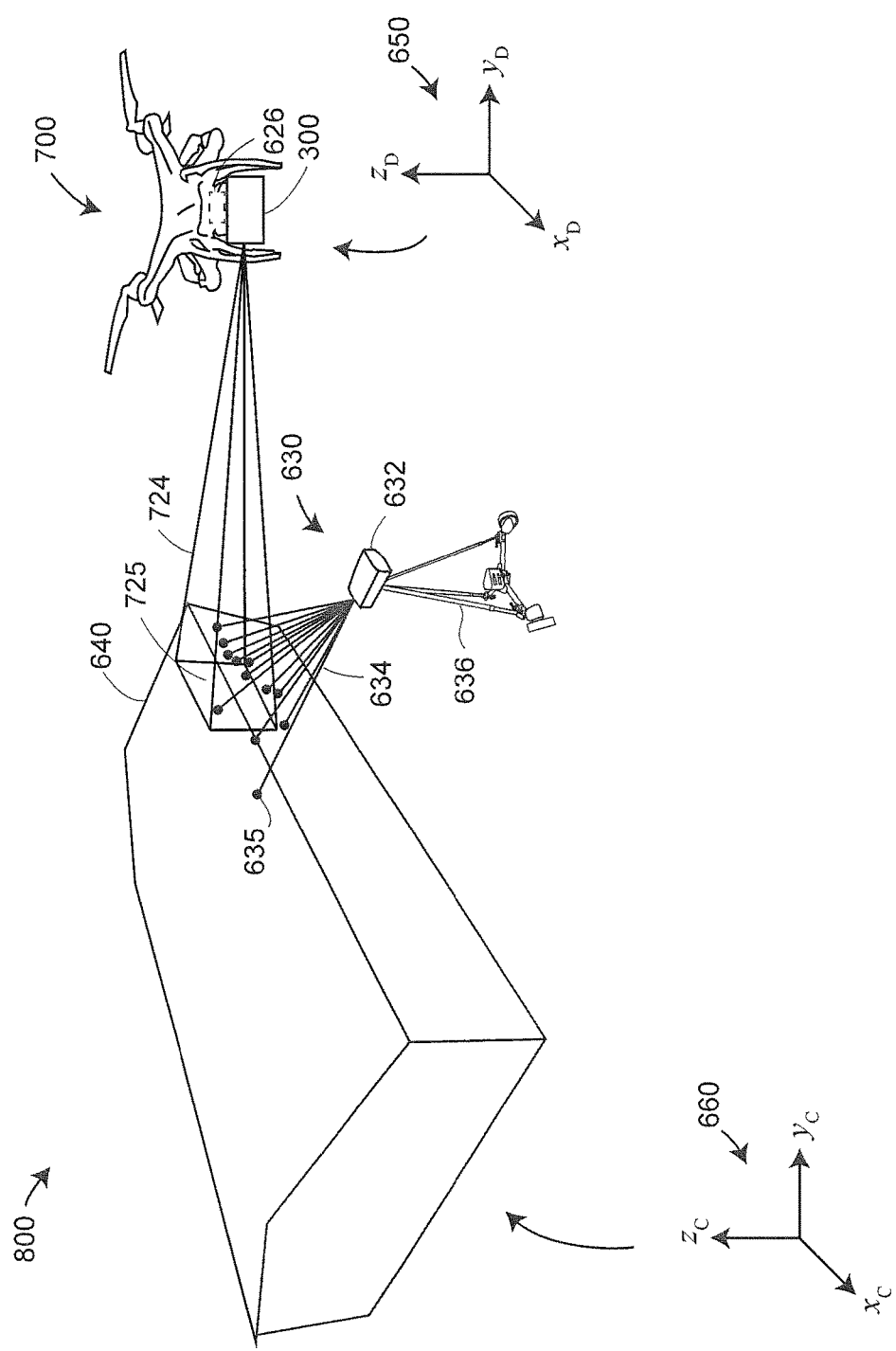
Figure 14:
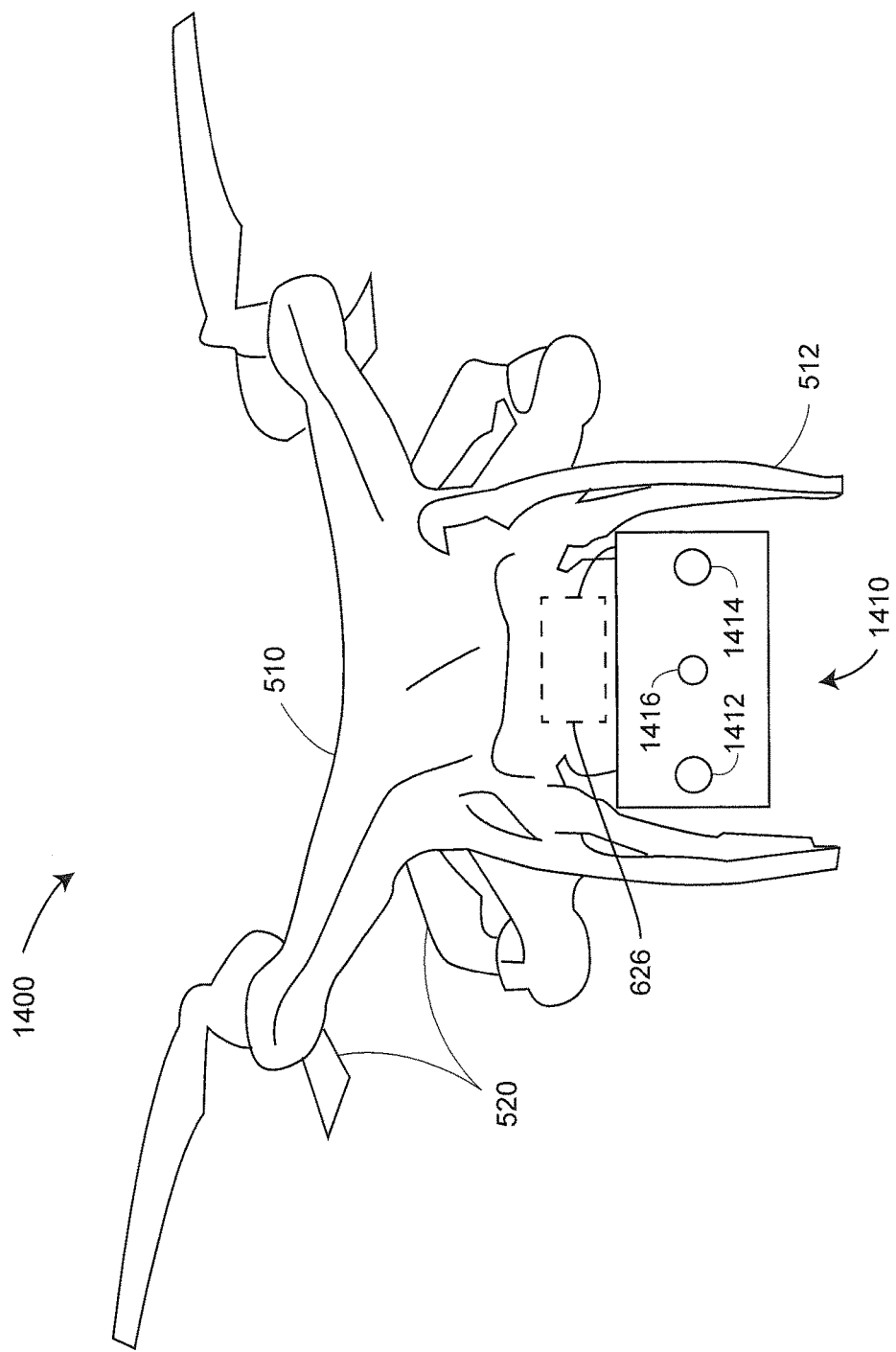
FIG. 14 is a perspective view of an aerial drone carrying a line scanner and a registration camera according to an embodiment.

In an embodiment, the motorized mobile platform moves the external projector to put the projected pattern of light from the external projector into the FOV of the registration camera, which is the camera 530, 390, 1416 in FIGS. 5, 7, 14, respectively. In other words, a control system monitors the number of projected spots received by the registration camera and adjusts the position of the motorized mobile platform to ensure that external projector is properly positioned to project spots within the FOV of the registration camera.

In an embodiment, the motorized mobile platform moves the external projector in such a way that the registration camera sees at least a portion of the pattern of light projected by the external projector before and after the movement of the motorized platform. An advantage of this approach is that these observations by the registration camera may assist in registering the object 3D coordinates determined before and after the movement.

In an embodiment, the motorized mobile platform moves the external projector so as to keep the number of dots seen by the registration camera above a specified minimum number and below a specified maximum number. In an embodiment, the specified minimum number and the specified maximum number are user-adjustable values. The density of dots projected over a given region increases as the external projector moves closer to the object. Consequently, as the aerial drone moves closer to the object, it may be advantageous to move the external projector closer to the object. A rotation mechanism provided on the external projector may be used synergistically with the movement mechanism on the external projector to obtain a desired number of projected spots in the FOV of the registration camera, as explained further herein below.

As the distance from the external projector to the object is changed and as the distance from the aerial drone to the object is changed, the optical power received by the photosensitive array of the camera in 3D imager of the aerial drone likewise changes. Consequently, in an embodiment, the optical power from the external projector is changed in response to the amount of light (e.g., the optical power) received by pixels in the photosensitive array in the registration camera. Likewise, it may be desirable to change the exposure time of the registration camera in response to the amount of light received by the registration camera.

Figure 10:
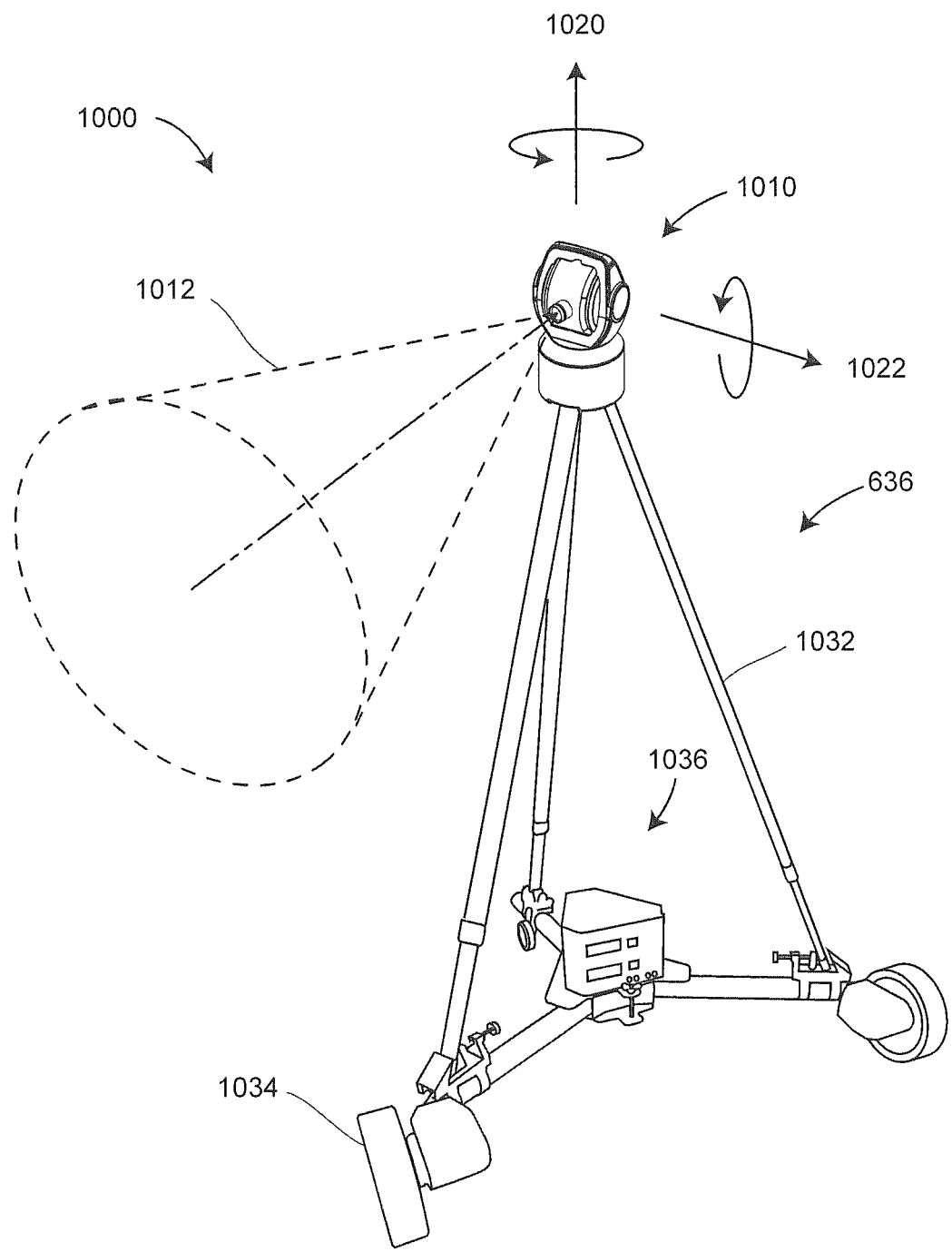
FIG. 10 is a perspective view of a rotatable external projector according to an embodiment.

In an embodiment, the projector 632 in FIG. 6 is replaced by the rotatable projector 1010 in FIG. 10 on a rotatable projector system 1000. In an embodiment, the rotatable projector 1010 is configured emit a beam of pattern of light 1012 along a direction determined by a rotation about a horizontal axis 1022 and a rotation about a vertical axis 1020. In an embodiment, the stand 636 includes a tripod 1032, wheels 1034, and a motor drive system 1036. In an embodiment, the rotation of the projector about the axes 1020 and 1022 is under computer control, which may be a computer on the rotatable projector system 1000 or a computer located elsewhere in the overall measurement environment.

In some embodiments, the projected spots serve only as landmarks. In this case, the exact direction of the projected pattern 1012 may not be too important. In other cases, the direction may be important. In this case, the device may include accurate angle transducers such as angular encoders that may, for example, be accurate to 5 microradians.

A number of different beam steering mechanisms and angle transducers may be used in the rotatable projector system 1000. In an embodiment, the beam steering mechanisms comprise a horizontal shaft and a vertical shaft, each shaft mounted on a pair of bearings and each driven by a frameless motor. The projector may be directly mounted to the horizontal shaft, but many other arrangements are possible. For example, a mirror may be mounted to the horizontal shaft to reflect projected light onto the object or reflect scattered light from the object onto a camera. In another embodiment, a mirror angled at 45 degrees rotates around a horizontal axis and receives or returns light along the horizontal axis. In other embodiments, galvanometer mirrors may be used to send or receive light along a desired direction. In another embodiment, a MEMS steering mirror is used to direct the light into a desired direction. Many other beam steering mechanisms are possible and may be used. In an embodiment, an angular encoder is used to measure the angle of rotation of the projector or camera along each of the two axes. Many other angle transducers are available and may be used.

Figure 11:
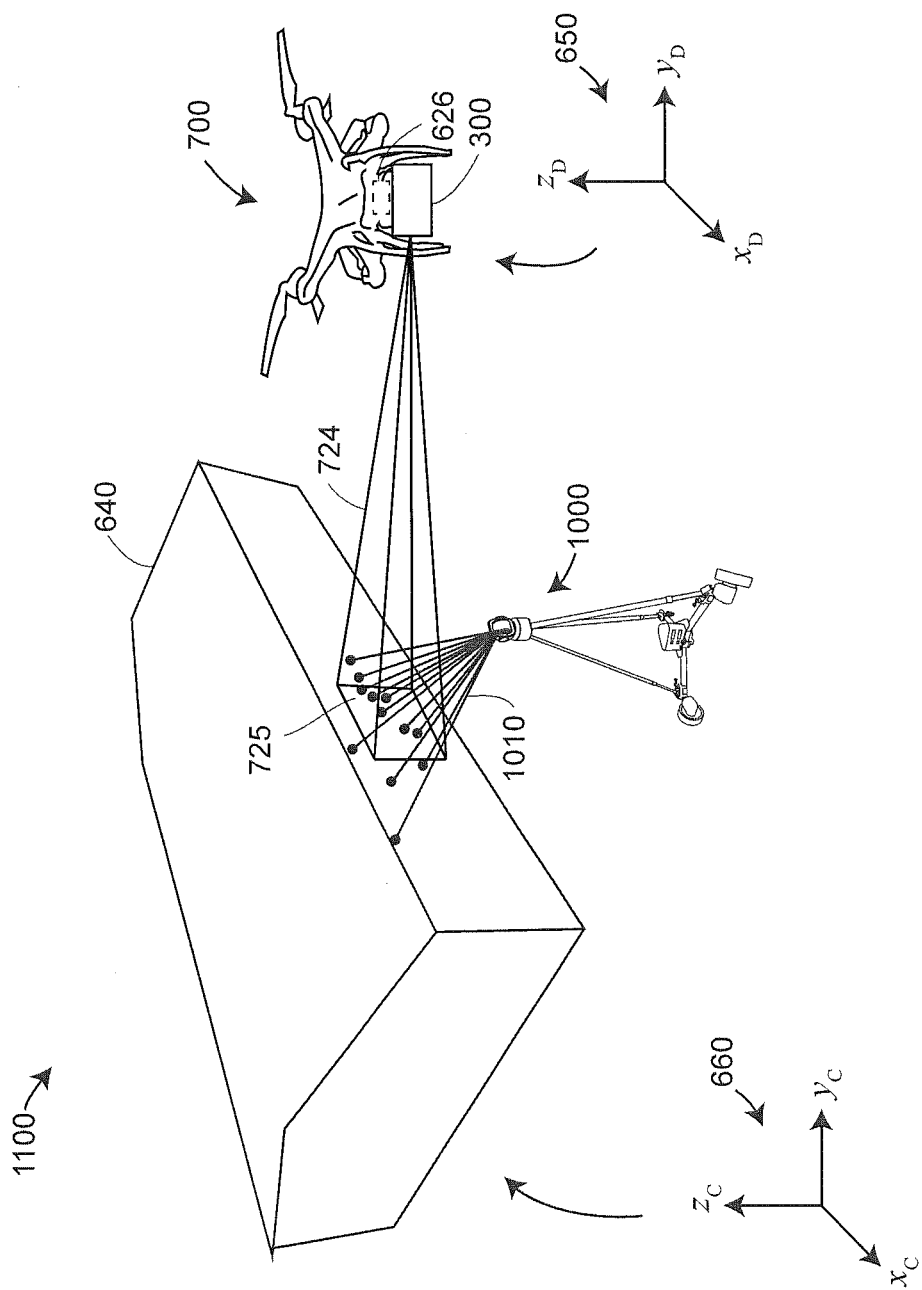
FIG. 11 illustrates a measurement scenario in which a rotation mechanism of the external projector directs a projected pattern of light onto an object at a desired location according to an embodiment.

FIG. 11 illustrates a measurement situation 1100 in which a rotatable projector system 1000 rotates to place the projected spots from a projected beam 1010 into desired locations on the object 640 according to the position of the drone 700. In an embodiment, the rotation mechanism of the external projector is configured to rotate the projected pattern of light to place it in the FOV of the registration camera of the 3D imager in the aerial drone. The registration is the camera 530, 390, 1416 in FIGS. 5, 7, 14, respectively.

In an embodiment, the rotation mechanism of the external projector is configured to rotate the projected pattern of light in such a way that the registration camera sees at least a portion of the pattern of light projected by the external projector before and after the rotation by the rotation mechanism. An advantage of this approach is that these observations by the registration camera may assist in registering the object 3D coordinates obtained before and after the rotation.

In an embodiment, the rotation mechanism is configured to rotate the pattern of light from the external projector so as to keep the number of dots seen by the registration camera above a specified minimum number and below a specified maximum number. For example, if the aerial drone moves closer to the object and at the same time rotates to point the 3D imager upward, it may be desirable to respond by moving the external projector closer to the object while at the same time rotating the projected light from the external projector upward. This keeps a relatively large number of projected spots from the external projector visible to the registration camera, which is usually a desirable result.

Figure 12:
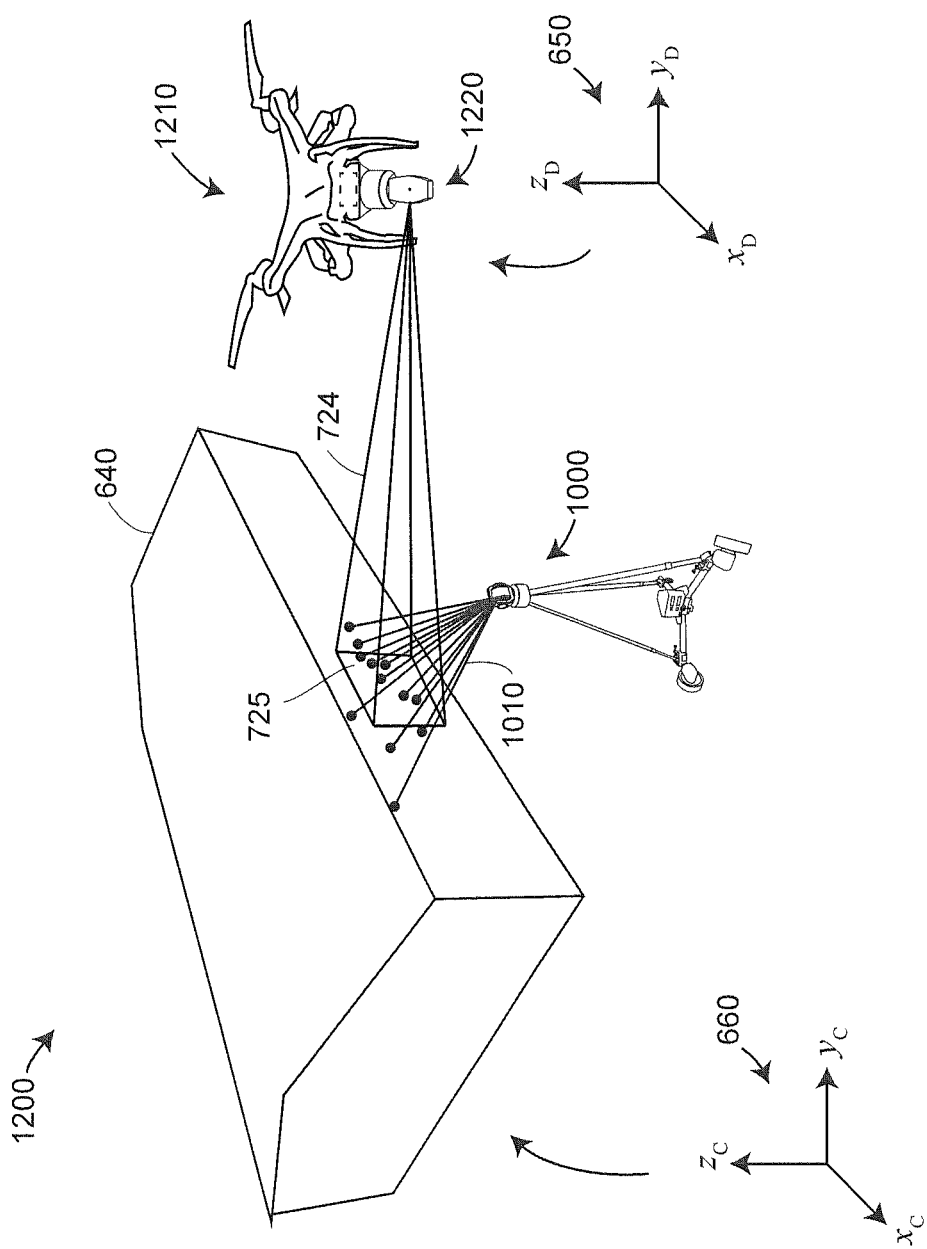
FIG. 12 illustrates a measurement scenario in which the 3D imager on an aerial drone is further redirected by a rotation mechanism according to an embodiment.

FIG. 12 illustrates a measurement situation 1200 in which a device such as the 3D imager 300 or the camera 530 is a part of an aerial drone 3D imager 1220 similar to the drone 500 or the drone 700 except that the 3D imager 1220 includes a rotatable steering mechanism. In an embodiment, the rotatable steering mechanism is substantially like the rotatable steering mechanism of the projector system 1000 except in being sized to hold the 3D imager elements.

In an embodiment, the drone flies to a desired location relative to an object 640 to be measured and then lands before making the measurement. A rotatable steering mechanism of a 3D imager 1220 steers the projected pattern of light to the desired location on the object 640 before making a measurement. In an embodiment, the projected spots 1010 are used to assist in registration. In a further embodiment, accurately known rotation angles of the rotatable mechanism of the 3D imager 1220 also contribute to the determination of the 3D coordinates of the surface of the object 640. An advantage of this approach is that a robot that has landed does not experience vibration from the rotating propellers, thus enabling more accurate measurement of 3D coordinates.

A way to minimize, but not eliminate, the effect of vibration from rotating propellers is to add a servo-controlled gimbal camera mount, which is a device configured keep the camera pointed in the same direction as the direction of the drone changes slightly. In an embodiment, a servo system makes use of signals from an inertial measurement unit to send signals to three brushless motors that keep the camera leveled.

Figure 13:
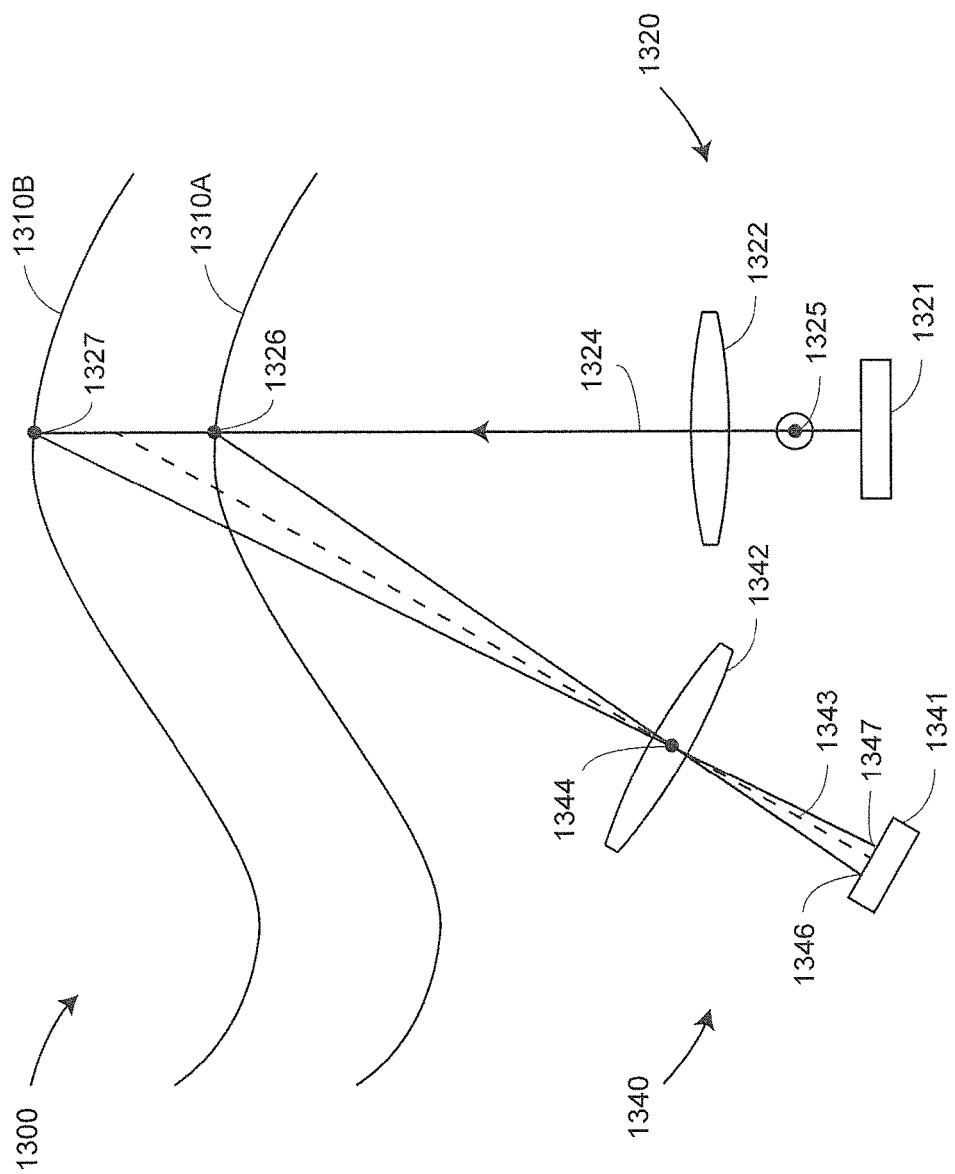
FIG. 13 is a schematic representation illustrating the principle of operation of a line scanner.

In an embodiment, the 3D imager device mounted to the mover further includes a laser line probe, also known as a line scanner. The operation of the laser line scanner (also known as a laser line probe or simply line scanner) is now described with reference to FIG. 13. The line scanner system 1300 includes a projector 1320 and a camera 1340. The projector 1320 includes a source pattern of light 1321 and a projector lens 1322. The source pattern of light includes an illuminated pattern in the form of a line. The projector lens includes a projector perspective center and a projector optical axis that passes through the projector perspective center. In the example of FIG. 13, a central ray of the beam of light 1324 is aligned with the perspective optical axis. The camera 1340 includes a camera lens 1342 and a photosensitive array 1341. The lens has a camera optical axis 1343 that passes through a camera lens perspective center 1344. In the exemplary system 1300, the projector optical axis, which is aligned to the beam of light 1324, and the camera lens optical axis 1343 are perpendicular to the line of light 1325 projected by the source pattern of light 1321. In other words, the line 1325 is in the direction perpendicular to the paper in FIG. 13. The line of light 1325 strikes an object surface, which at a first distance from the projector is object surface 1310A and at a second distance from the projector is object surface 1320A. It is understood that at different heights above or below the paper of FIG. 13, the object surface may be at a different distance from the projector than the distance to either object surface 1310A or 1310B. For a point on the line of light 1325 that also lies in the paper of FIG. 13, the line of light intersects surface 1310A in a point 1326 and it intersects the surface 1310B in a point 1327. For the case of the intersection point 1326, a ray of light travels from the point 1326 through the camera lens perspective center 1344 to intersect the photosensitive array 1341 in an image point 1346. For the case of the intersection point 1327, a ray of light travels from the point 1327 through the camera lens perspective center to intersect the photosensitive array 1341 in an image point 1347. By noting the position of the intersection point relative to the position of the camera lens optical axis 1343, the distance from the projector (and camera) to the object surface can be determined. The distance from the projector to other points on the intersection of the line of light 1325 with the object surface, that is points on the line of light that do not lie in the plane of the paper of FIG. 13, may similarly be found. In the usual case, the pattern on the photosensitive array will be a line of light (in general, not a straight line), where each point in the line corresponds to a different position perpendicular to the plane of the paper, and the position perpendicular to the plane of the paper contains the information about the distance from the projector to the camera. Therefore, by evaluating the pattern of the line in the image of the photosensitive array, the three-dimensional coordinates of the object surface along the projected line can be found. Note that the information contained in the image on the photosensitive array for the case of a line scanner is contained in a (not generally straight) line.

FIG. 14 illustrates a drone 1400 configured to carry a 3D imager 1410 that includes a line projector 1412, a first camera 1414, and a second camera 1416. The first camera is configured to cooperate with the line projector to determine 3D coordinates of object points intersected by the projected line. In an embodiment, the projector 1412 corresponds to the projector 1320 of FIG. 13, and the camera 1414 corresponds to the camera 1340 of FIG. 13. In an embodiment, the second camera 1416 is a color camera configured to respond to visible light. In an embodiment, the camera 1416 is configured to respond to light from a stationary external projector, thereby enabling registration of the multiple 3D data sets collected by the laser scanner over different positions and orientations of the drone 1400. In an embodiment, the 3D imager 1410 is configured to work with a computer 626, which might be a personal computer.

Figure 15:
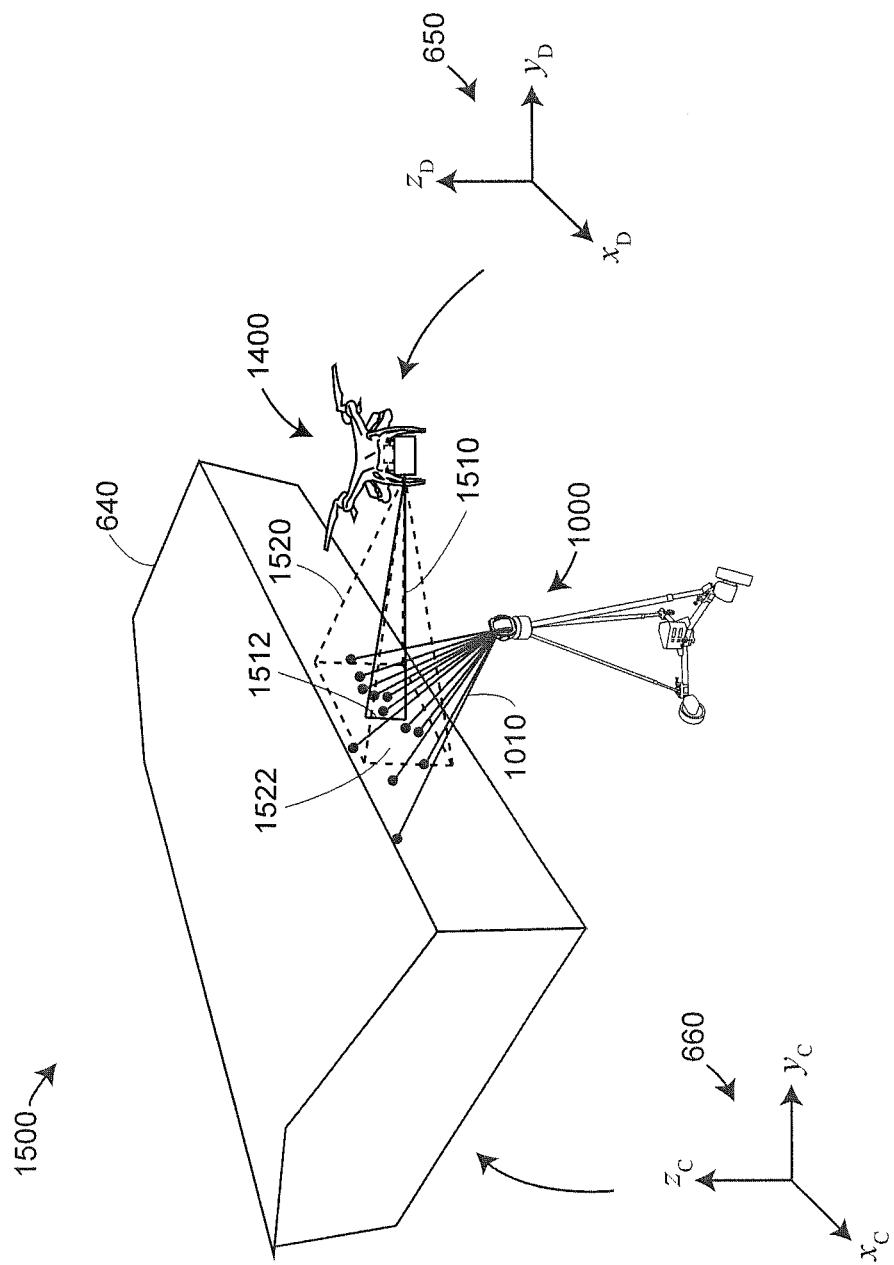
FIG. 15 illustrates a measurement scenario in which an aerial drone projects a line of light on an object, while an external projector projects a pattern of light onto the object according to an embodiment.

FIG. 15 illustrates a measurement scenario 1500 in which a drone 1400 that includes a 3D imager 1410 as shown in FIG. 14 projects a beam of light 1510 that produces a line of light 1512 on a surface of an object 640. This image of the line of light 1512 is captured by the camera 1414 and is used to determine 3D coordinates of the line of light on the surface of the object 640 in the frame of reference of the 3D imager 1410. In an embodiment, the color camera 1416 has a relatively larger angular view 1520 that covers an area 1522 on the object surface. The color camera captures several spots from the stationary external projector 1000, which may be a rotatable projector. In an embodiment, the color camera captures the line of light projected by the scanner as well as the spots projected by the external projector 1000. In another embodiment, the color camera includes an optical filter to block out the wavelength of the projected line of light. In most cases, the drone will fly relatively close to the object 640 when projecting a line of laser light, as this permits maximum accuracy to be obtained. In an embodiment, the laser line probe flies along a smooth path, covering the surface with the line of light, which produces a collection of 3D coordinates over a surface area.

In another embodiment, the drone lands before projecting the laser light 1512. In an embodiment, a high accuracy rotatable mount of provided to steer the beam of light 1510 from the 3D imager 1410. In an embodiment, the angular accuracy of the beam steering mechanism is high, for example, 5 microradians, thereby enabling high registration accuracy of measured 3D coordinates, even if registration spots from the beams 1010 are not provided.

In other embodiments, the line projector 1412 may be replaced by an area projector. In an embodiment, the area projector projects single shot coded patterns of light that are captured by a camera to determine 3D coordinate values of the object 640. In another embodiment, the drone lands before measurements begin and the drone projects a sequence of patterns that are evaluated to determine 3D coordinates of the object 640 to relatively high accuracy. One such sequential measurement method known in the art is the phase-shift method in which optical power of projected light is modulated sinusoidally along one direction and the phase of the sinusoidal pattern shifted side-to-side at least three times. As is well known in the art, the resulting optical powers collected at each point for each of the three or more phase shifts is sufficient to enable determination of 3D coordinates. An advantage of this method is high rejection of background light. In an embodiment, a digital micromirror device (DMD) is used to produce desired patterns such as coded patterns or phase-shifted sinusoidal patterns.

Other methods are known to minimize the effects of background light. In an embodiment, all cameras and projectors include optical filters to pass desired wavelengths of light and block unwanted wavelengths. In some cases, such optical filters may be thin-film dielectric coatings applied to windows or lenses. Another method to minimize the effect of background light is to pulse the projected light and to reduce the camera exposure time in correspondence. Another possibility is to use a fast lock-in amplifier, in which the optical power of light is modulated and then filtered to extract the modulation frequency. Image chips with such a lock-in amplifying functionality are made, for example, by the company Heliotis.

In an embodiment, the projected optical power is varied according to the distance from the object. For example, for the projector 350 of the 3D imager 300, laser light may be sent through a diffraction grating to obtain spots that remain relatively small and sharply defined over relatively large distances. For this case, it is possible in some cases to project light within the eye safe class 1 laser safety limit while operating by up to 6 meters from the object 640. In an embodiment, a diffraction grating is configured to produce some spots that are more powerful than others.

Although the figures described herein above have used outdoor measurements as examples, it is equally possible to make measurements indoors, for example, in factory environments. In some cases, a drone may be restricted to a safety region in which humans are not allowed. In some cases, a drone may have a parachute configured to open in the event of a rapid fall, which might be detected, for example, by an inertial measurement unit (IMU). In other embodiments, a drone may be attached to a tether.

Figure 16:
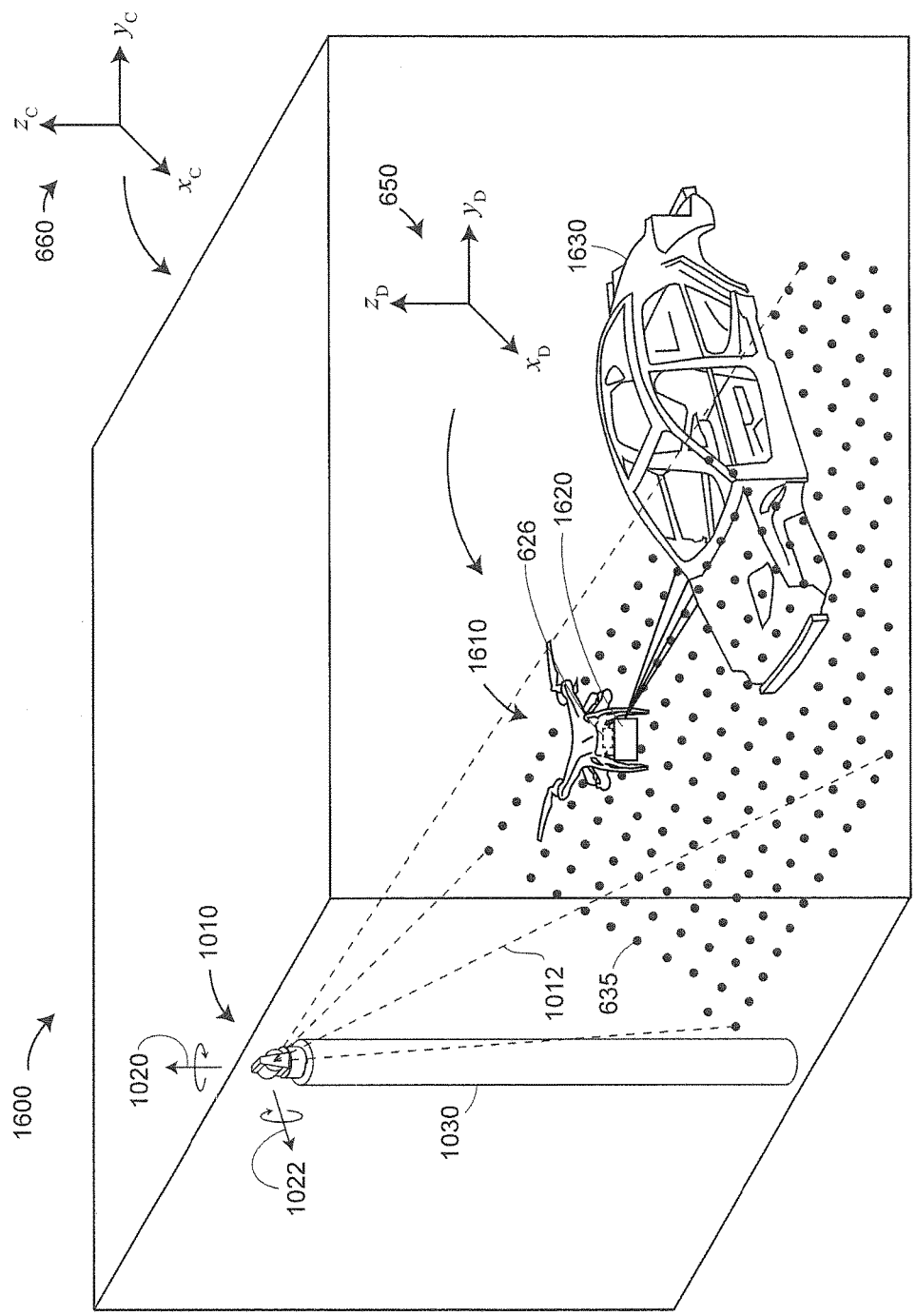
FIG. 16 illustrates a measurement scenario in which an aerial drone is used together with an external projector to measure an object indoors.

FIG. 16 illustrates a measurement scenario 1600 in which a drone 1610 includes a 3D imager 1620 configured to measure 3D coordinates of an object 1630 in cooperation with a projector system 1010. In an embodiment, the 3D imager 1620 is configured to cooperate with a computing device 626 and may include, for example, any of the 3D measuring devices 530, 300, 1220, or 1410 of FIGS. 5, 7, 12, and 14, respectively. In an embodiment, the projector system 1010 is configured to sit in a fixed position, for example, on a pillar 1030. In an embodiment, the projector system 1010 is configured to rotate about two axes, for example about the axes 1020 and 1022. In an embodiment, the projector system is configured to project beams of light 1012 to form a collection of spots 635 in a grid pattern. Alternatively, the projector system 1010 may project any other pattern of light. In embodiments, the drones are temporarily mounted on magnetic mounts or other structures.

Figure 17:
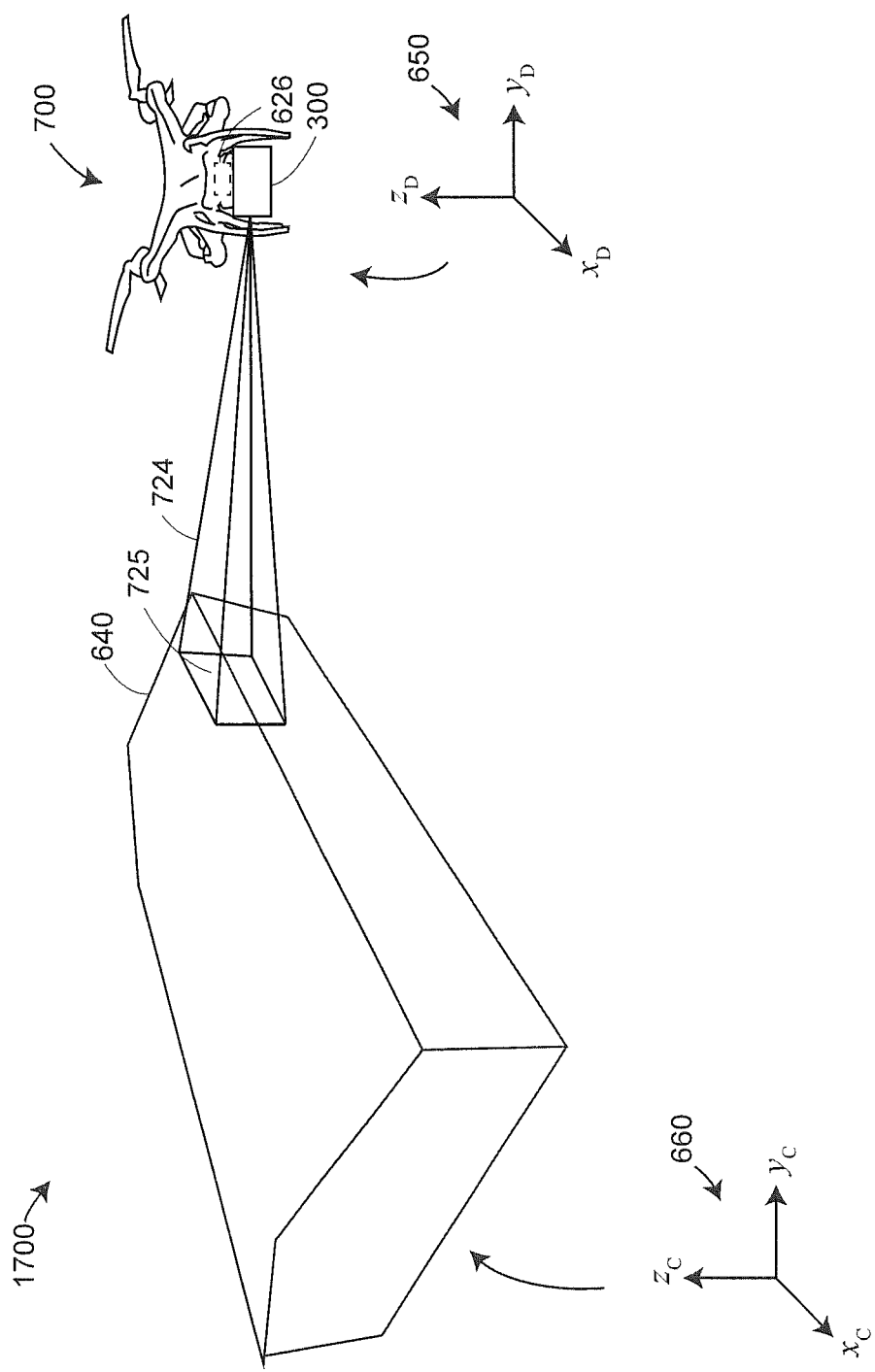
FIG. 17 illustrates a measurement scenario in which a 3D imager having two cameras and an internal projector in a triangulation pattern are used in combination with a registration camera to obtain 3D coordinates of an object without use of an external projector according to an embodiment.

FIG. 17 illustrates a measurement scenario 1700 in which a drone 700 that includes a 3D imager 300 and computing device 626 operates without imaging a pattern of light projected onto the object by an external projector 630. A 3D imager 300 described herein above in reference to FIGS. 3 and 7 has the capability of imaging an object at near and far distances, especially if provision is made to vary the optical power of the projected light. It may be possible, for example, for a measurement device to measure at distances of 6 meters at relatively high power and relatively low resolution while measuring at a distance of 0.5 meters at relatively lower power with improved resolution and accuracy. In an embodiment, the camera 390 is capable of measuring over a FOV of around 60 degrees, thereby enabling many target features to be captured as cardinal points for use in registering multiple images using videogrammetry techniques. In many cases, because of the advantages provided by the multiple epipolar constraints that must be satisfied simultaneously, as explained herein above with reference to FIG. 4B, it is possible to relatively good registration and relatively good 3D accuracy even without the projecting of a pattern of light by an external projector such as the projector 630. Because the registration is relatively good and because the scene may be imaged in 3D both near to the object and far from the object, a drone 1700 may be able to provide its own guidance control, perhaps in conjunction with maps or CAD models provided to it through a computer or network interface.

In an embodiment, an additional 3D measuring device such as a laser tracker, total station, or a time-of-flight (TOF) laser scanner is used to determine 3D coordinates of reference markers having a fixed position relative to an object being measured. In this context, a TOF laser scanner is a device that measures a distance and two angles to a diffusely scattering target. The term TOF in this instance means that the scanner measures the time required for an emitted light signal to reach the target and return to the scanner. The speed of light in air is used in combination with the determined time to calculate the distance to the target. This TOF method is distinguished from the method used by a triangulation scanner (3D imager) which is based on a triangulation calculation and does not depend directly on the speed of light in air.

A laser tracker typically has an accuracy of 100 micrometers or better, while total stations and TOF laser scanners typically have accuracies of a few millimeters. For example, a laser tracker may be used to determine that the distance between two parallel walls is 10 meters. This distance value is then probably known to an accuracy of about 100 micrometers. In contrast, a 3D imager 300 attached to a drone 700 may know this distance to within about a centimeter or perhaps a few centimeters over this 10 meter distance. The distance between the walls as measured by the tracker may then be transferred to the measurements made by the 3D imager 300 between the walls, and the resulting coordinate values rescaled according to the more accurate distance measured by the laser tracker. Likewise, a total station or a TOF laser scanner may be used to determine a distance between two parallel walls to an accuracy of a few millimeters, which is still usually expected to be several times better than the accuracy over the same distance as measured by a drone 700. In broad terms, coordinate measurements of a relatively accurate reference coordinate measuring device such as a laser tracker, total station, or TOF scanner, may make measurements enabling improvement in measurements made by a drone that includes a 3D imager. In most cases this improvement is possible even if an external projector is used in combination with the drone-carried 3D imager.

In an embodiment, a computer 626 establishes a Remote Desktop link to a personal computer in possession of an operator. The operator then sees whatever data is collected and processed by the computer 626. In another embodiment, data is sent to a remote computer or computer network over a high speed wireless data link for further processing. In a further embodiment, data is sent to a remote computer over a wired link such as an Ethernet link. A wired link is practical, for example, if the drone is attached to a tether. In some embodiments, detailed data are stored in memory on the drone for post-processing, while 2D and 3D data are transmitted to a remote computing device wirelessly but at a lower frame rate, for example, at 3 or 4 frames per second.

FIG. 18 further describes the computing system associated with the drone systems described herein above. The drone system, which may be any of the drone systems described herein above, includes computing elements 626. The most cases, the computing elements 626 will include at least a processor, a memory, and a communication interface. In some cases, the computing elements 626 is equivalent to a personal computer so that a Remote Desktop link may be established with a remote computer. The computing elements 626 are part of an overall computing system 1800 that may optionally include a one or more additional computing elements 1810 and 1820 and a networking computing component (the Cloud) 1830. The network interface provided by the computing elements 626 may support wired or wireless communication between the computing elements 626 and the optional computing elements 1810, 1820, and 1830.

In accordance with an embodiment, a three-dimensional (3D) coordinate measuring system is provided. The system includes an external projector configured to operate while stationary and to project a first projected pattern of light onto an object. The system further includes an aerial measuring device that includes an aerial drone and a 3D imaging device, the 3D imaging device being attached to the aerial drone, the aerial measuring device being separate from the external projector, the aerial measuring device being configured to cooperate with the external projector to determine 3D coordinates of the object.

In an embodiment, the 3D imaging device further comprises a first two-dimensional (2D) camera configured to capture a first 2D image from a first position of the aerial drone and a second 2D image from a second position of aerial drone, the second position being different than the first position. The 3D imaging device is configured to identify three cardinal points common to the first image and the second image, each of the three cardinal points derived from the first projected pattern of light on the object or from natural features of the object, at least one of the three cardinal points being derived from the first projected pattern of light. In this embodiment, the 3D imaging device is further configured to determine first 3D coordinates of a first object point, second 3D coordinates of a second object point, and third 3D coordinates of a third object, the determined first 3D coordinates, determined second 3D coordinates, and determined third 3D coordinates based at least in part on the three cardinal points in the first image and the three cardinal points in the second image.

In another embodiment, the 3D coordinate measuring system of claim the external projector is configured to project a first collection of spots of light onto the object. In another embodiment, the external projector comprises a source of laser light and a diffraction grating, the external projector being configured to project laser light through the diffraction grating and onto the object. In another embodiment, the external projector is configured to adjust power of the laser light according to the amount of light received by pixels of the first 2D camera.

In still another embodiment, the system further includes an internal projector configured to project a second pattern of projected light through a projector perspective center onto the object. A second 2D camera is configured to form a second camera image of the second pattern of projected light on the object, the second 2D camera having a camera perspective center, there being a baseline between the projector perspective center and the camera perspective center, the length of the baseline being a baseline distance. The 3D imaging device is further configured to determine the 3D coordinates of the object based at least in part on the second pattern of projected light, the second camera image, and the baseline distance.

In an embodiment, the first 2D camera is a color camera. In an embodiment, the internal projector is configured to project light a pulsed pattern of light.

In still another embodiment, the external projector is further configured to be moved by a motorized device. In an embodiment, the motorized device is a mobile platform having motorized wheels. In an embodiment the motorized device is an aerial drone.

In still another embodiment the aerial drone is a helicopter. In an embodiment the aerial drone is a quadcopter. In still another embodiment, the aerial drone is a fixed wing aircraft. In an embodiment, the second pattern of projected light is a line of light.

In still another embodiment, the external projector includes a first mechanism configured to steer light from the external projector into a plurality of directions. In an embodiment, the first mechanism is configured to steer the light from the external projector about two orthogonal axes. In an embodiment, a projector angular transducer is provided to measure an angle of rotation of the first mechanism. In an embodiment, the aerial drone device further includes a second mechanism configured to steer the 3D imaging device into a plurality of directions. In an embodiment, the second mechanism is further configured to steer the 3D imaging device about two orthogonal axes. In an embodiment, an angular transducer is provided to measure an angle of rotation of the second mechanism.

In still another embodiment, the system is further configured to detect motion of the external projector relative to the object, the determination based at least in part on movement of the first projected pattern of light relative and on cardinal points that are based on natural features of the object. In an embodiment, the system is further configured to determine a pose of the external projector based at least in part on the first projected pattern of light and on those cardinal points that are obtained from natural features of the object. In an embodiment, the system is further configured to detect motion of the external projector relative to the object, the relative motion determined based at least in part on the first projected pattern of light, an observed movement of the first projected pattern of light, the second pattern of projected light, the second camera image, and the baseline distance. In an embodiment, the system is configured to determine a pose of the external projector based at least in part on the first projected pattern of light, the observed movement of the first projected pattern of light, the second pattern of projected light, the second camera image, and the baseline distance.

In accordance with another embodiment, a three-dimensional (3D) coordinate measuring system is provided. The system includes an external projector configured to project a first projected pattern of light onto an object. The system further includes an aerial measuring device in a device frame of reference, the aerial measuring device including a triangulation scanner and a registration camera, the triangulation scanner including an internal projector and a first camera, the triangulation scanner configured to determine 3D coordinates of the object in the device frame of reference in a first instance and a second instance, the registration camera configured to image the first projected pattern of light in the first instance and the second instance, the aerial measuring device configured to register in a common frame of reference the determined 3D coordinates in the first instance and in the second instance based at least in part on the registration camera image of the first projected pattern of light in the first instance and the second instance.

In another embodiment, the first projected pattern of light is projected from the external projector while the external projector is stationary. In another embodiment, the external projector is attached to a motorized mobile platform configured to move the external projector to multiple positions.

In an embodiment, the motorized mobile platform includes motorized wheels. In an embodiment, the motorized mobile platform is a drone. In an embodiment, the motorized mobile platform is a helicopter. In an embodiment, the motorized mobile platform is a quadcopter. In an embodiment, the motorized mobile platform is configured to move the external projector in such a way that a portion of the first projected pattern is common to images obtained by the registration camera before and after movement of the external projector.

In still another embodiment a rotation mechanism is configured to rotate the first projected pattern of light about a first axis. In an embodiment, the rotation mechanism is configured to rotate the first projected pattern of light about a second axis. In an embodiment, an angle transducer is configured to measure an angle of rotation of the first projected pattern of light about the first axis. In an embodiment, the rotation mechanism is configured to rotate the first projected pattern of light about the first axis to put the first projected pattern of light in a field-of-view of the registration camera.

In still another embodiment, the motorized mobile platform is configured to move the external projector to put the first projected pattern of light in a field-of-view of the registration camera.

In an embodiment, the motorized mobile platform is configured to move the external projector in such a way that a portion of the first projected pattern is common to images obtained by the registration camera before and after movement of the external projector.

In an embodiment, the rotation mechanism is configured to rotate the first projected pattern of light in such a way that a portion of the first projected pattern is common to images obtained by the registration camera before and after movement of the external projector.

In still another embodiment, the first projected pattern of light includes a collection of illuminated dots. In an embodiment, the motorized mobile platform is configured to move the external projector so as to keep the number of dots seen by registration camera above a specified minimum number and below a specified maximum number. In an embodiment, the rotation mechanism is configured to rotate the first projected pattern of light so as to keep the number of dots seen by registration camera above a specified minimum number and below a specified maximum number. In an embodiment, the optical power of the projected dots is adjusted to keep the light level received by pixels in the registration camera within a specified range. In still another embodiment, the registration camera is a color camera.

In accordance with another embodiment, a three-dimensional (3D) coordinate measuring system is provided. The system includes an aerial drone attached to a triangulation scanner and a registration camera. The triangulation scanner including a first projector, a first camera, and a second camera, the first camera, the second camera, and the third camera arranged in a triangle. The first projector, the first camera, and the second camera having first epipolar constraints. The first projector configured to project a projected first pattern of light on the object. The first camera configured to form a first image of the projected first pattern of light on the object. The second camera configured to form a second image of the projected first pattern of light on the object. The system further configured to determine 3D coordinates of an object based at least in part on the projected first pattern of light, the first image, the second image, and the first epipolar constraints, the registration camera configured to obtain an image of the object and to extract from the image cardinal points based on natural features of the object. The system further being configured to register multiple sets of the 3D coordinates obtained from the triangulation scanner, the registration based at least in part on matching of common cardinal points present in successive images of the registration camera.

In still another embodiment, the aerial drone is configured to fly according to navigation signals, the navigation signals based at least in part on data from the registration camera. In another embodiment, the aerial drone is further configured to fly nearer to an object or farther from an object according to a level of feature detail present in the images of the registration camera. In another embodiment, the registration camera is a color camera and the 3D coordinate measuring system is further configured to place the observed colors on the registered 3D coordinates.

In still another embodiment, the system further includes a drone computer configured to communicate with a remote computer by Remote Desktop mode, the drone computer configured to enable a remote user to view images obtained from the aerial drone.

In still another embodiment, the system further includes a drone computer configured to communicate with a remote computer through wired or wireless signals.

In still another embodiment, the system further includes constraints to keep the drone located in safety zones, the constraints being selected from the group consisting of a tether and a barrier.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A three-dimensional (3D) coordinate measuring system, comprising
   an aerial measuring device that includes an aerial drone and a 3D measurement device, the 3D measurement device being rotatably attached to the aerial drone, the aerial drone is movable from a first position to a stationary second position, and wherein the 3D measurement device being configured to optically measure points on the surface of an object;
   one or more processors configured to execute nontransitory computer readable instructions, the computer readable instructions comprising:
      moving the aerial measuring device from the first position;
      landing the aerial measuring device at the second position;
      rotating the 3D measurement device to optically measure a first object point; and
      determining a first 3D coordinates of the first object point with the 3D measuring device.

2. The system of claim 1, wherein the camera is coupled to the aerial measuring device by a servo-controlled gimbal mount.

3. The system of claim 2, wherein the aerial measuring device further includes an inertial measurement unit coupled to communicate with the one or more processors.

4. The system of claim 3, wherein the computer readable instructions further comprise changing the position of the gimbal mount to keep the camera pointing in a direction based at least in part on a signal from the inertial measurement unit.

5. The system of claim 1, wherein the aerial measuring device further includes an angular encoder arranged to measure an angular position of the 3D measurement device.

6. The system of claim 5, wherein the encoder has an angular accuracy of 5 microradians.

7. The system of claim 1, further comprising:
   an external projector operable to project a projected pattern of light onto an object; and
   wherein the 3D measurement device includes a camera configured to acquire an image of the pattern of light.

8. The system of claim 7, wherein the computer readable instructions further comprise:
   acquiring a first image with the camera;
   acquiring a second image with the camera;
   identifying with the 3D imaging device three cardinal points common to the first image and the second image; and
   wherein at least one of the three cardinal points is derived from the first projected pattern of light.

9. The system of claim 8, wherein at least one of the three cardinal points is a natural feature.

10. The system of claim 9, wherein the natural feature is identified using one or more of scale invariant feature transform, edge detection, blob detection or ridge detection.

11. The system of claim 7, wherein the computer readable instructions further comprise:
   configuring the external projector to project a first collection of spots of light onto the object, wherein the external projector comprises a source of laser light and a diffraction grating;

projecting with the external projector laser light through the diffraction grating and onto the object; and adjusting power of the laser light according to an amount of light received by pixels of the first 2D camera.

12. The system of claim 7, wherein external projector includes a motorized device that is operable to move the external projector from a third position to a fourth position.

13. The system of claim 12, wherein the motorized device comprises motorized wheels or an aerial drone.

14. The system of claim 7, wherein:
the external projector includes a first mechanism operable to steer light from the external projector into a plurality of directions;
the first mechanism is operable to steer the light from the external projector about two orthogonal axes; and
a projector angular transducer is provided to measure an angle of rotation of the first mechanism.

15. The system of claim 1, wherein the 3D measurement device is one of an laser line probe, a triangulation scanner, or an area projector.

* * * * *